US012560760B2

(12) United States Patent
Lo et al.

(10) Patent No.: US 12,560,760 B2
(45) Date of Patent: Feb. 24, 2026

(54) SEMICONDUCTOR PHOTONICS DEVICE AND METHODS OF FORMATION

(71) Applicant: Taiwan Semiconductor Manufacturing Company, Ltd., Hsinchu (TW)

(72) Inventors: Wen-Shun Lo, Hsinchu County (TW); Jing-Hwang Yang, Zhubei City (TW); Yingkit Felix Tsui, Cupertino, CA (US)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 362 days.

(21) Appl. No.: 18/305,081

(22) Filed: Apr. 21, 2023

(65) Prior Publication Data

US 2024/0353617 A1 Oct. 24, 2024

(51) Int. Cl.
| | |
|---|---|
| *G02B 6/122* | (2006.01) |
| *G02B 6/12* | (2006.01) |
| *G02B 6/13* | (2006.01) |
| *G02F 1/025* | (2006.01) |

(52) U.S. Cl.
CPC .............. *G02B 6/122* (2013.01); *G02B 6/13* (2013.01); *G02F 1/025* (2013.01); *G02B 2006/12142* (2013.01)

(58) Field of Classification Search
CPC .... G02B 6/136; G02B 6/122; G02B 6/12026; G02B 6/12004; G02B 6/12002; G02B 6/132; G02B 6/13; G02F 1/025
See application file for complete search history.

(56) References Cited

U.S. PATENT DOCUMENTS

2006/0088239 A1* 4/2006 Aalto .................... G02F 1/2257
385/16
2023/0123000 A1* 4/2023 Kamineni .............. G02B 6/136
385/14

* cited by examiner

*Primary Examiner* — Michael P Mooney
(74) *Attorney, Agent, or Firm* — Harrity & Harrity, LLP

(57) ABSTRACT

A waveguide structure and an optical modulator structure of a photonic integrated circuit are formed in a dielectric region above a substrate of a semiconductor device. Openings are then formed through the dielectric region and to the substrate so that material can be removed from the substrate to form air gaps between the substrate and the dielectric region. The openings are then sealed by depositing dielectric material in the openings. Sealing the openings reduces the likelihood of exposure of the dielectric region and other regions of the semiconductor device to exposure to environmental elements such as humidity and oxygen. The reduced likelihood of exposure to these environmental elements, due to sealing the openings, may reduce the likelihood and/or rate of formation of defects in the dielectric region and the other regions of the semiconductor device.

20 Claims, 24 Drawing Sheets

200

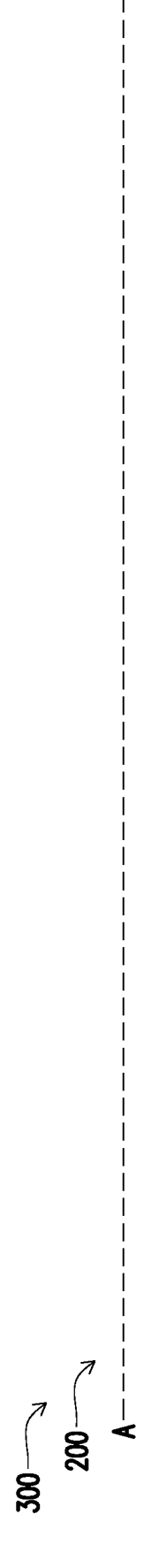
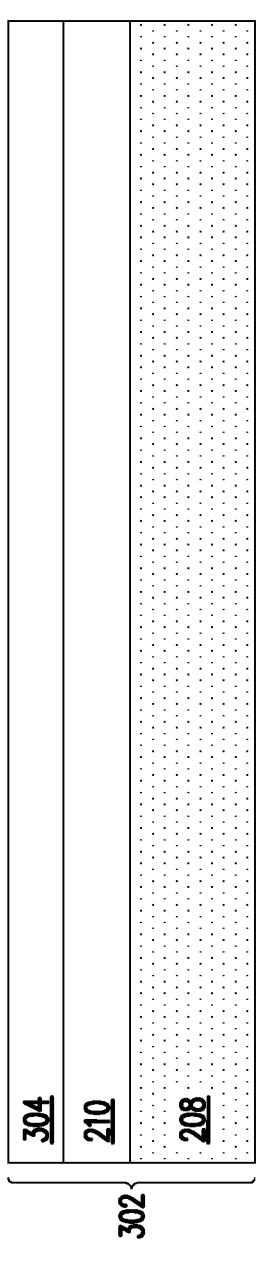
FIG. 3A

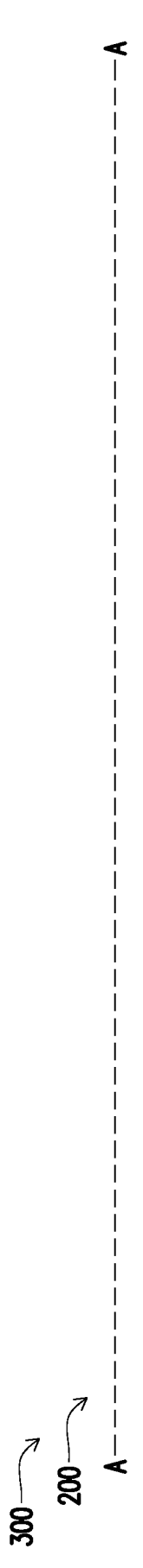
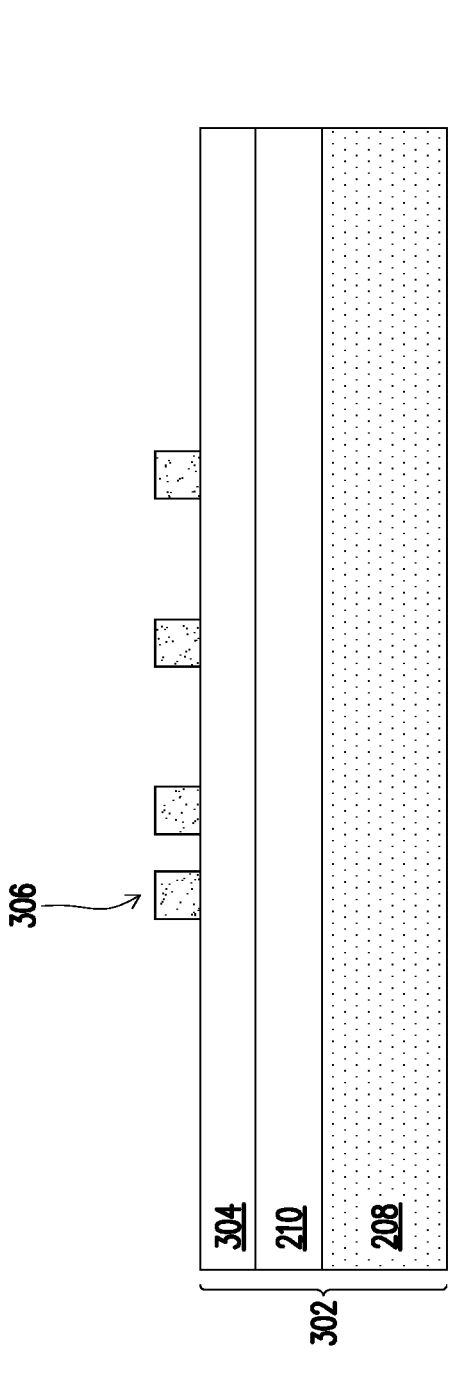
306
304
210
208
302
300
200
A
A
FIG. 3C

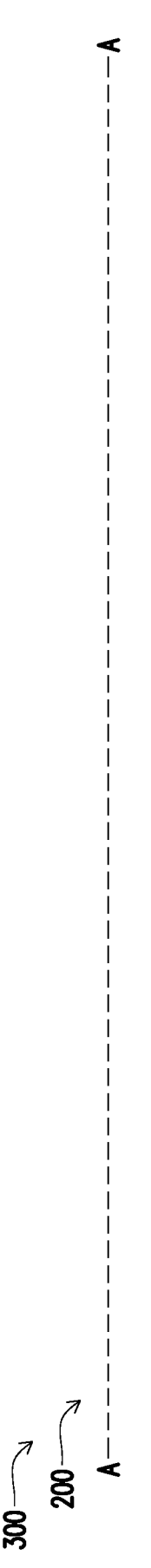
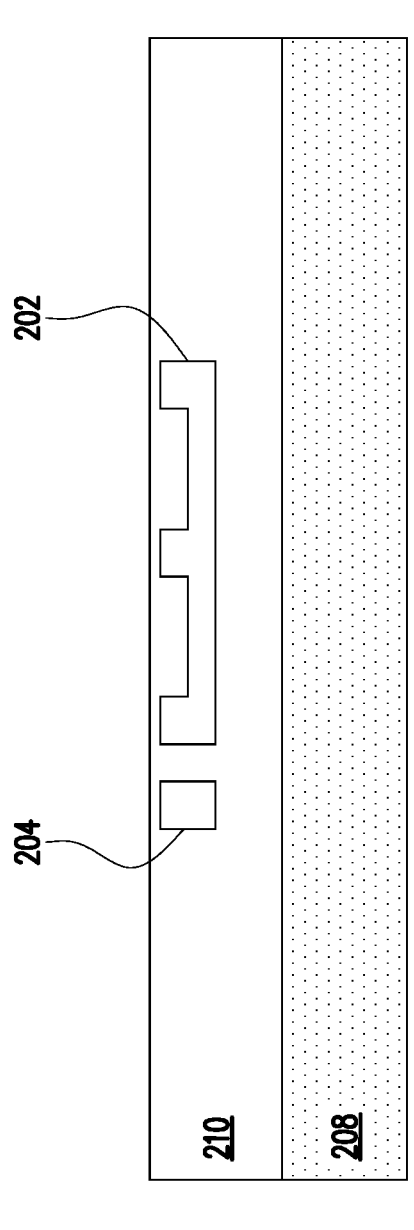
FIG. 3E

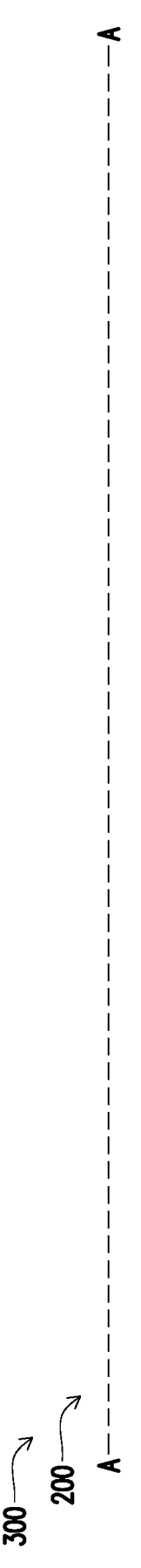
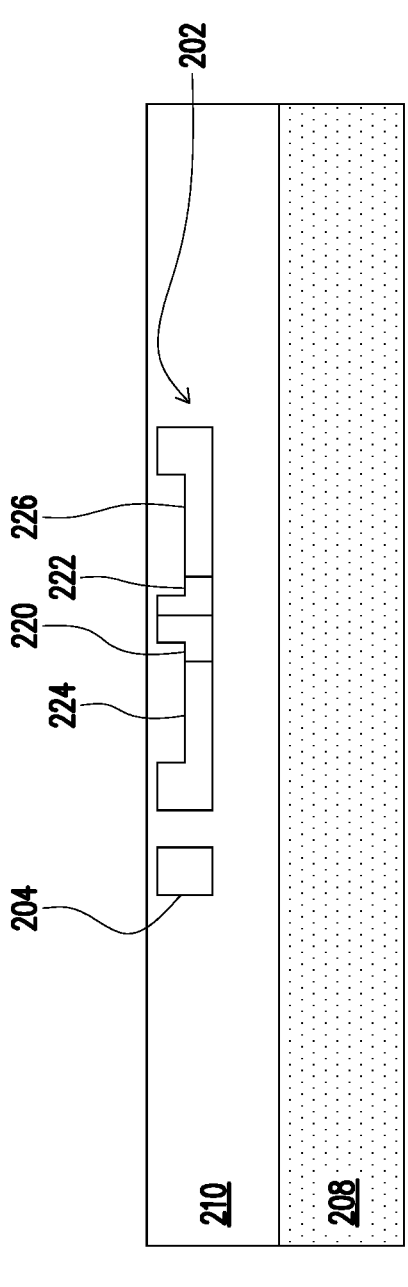
FIG. 3F

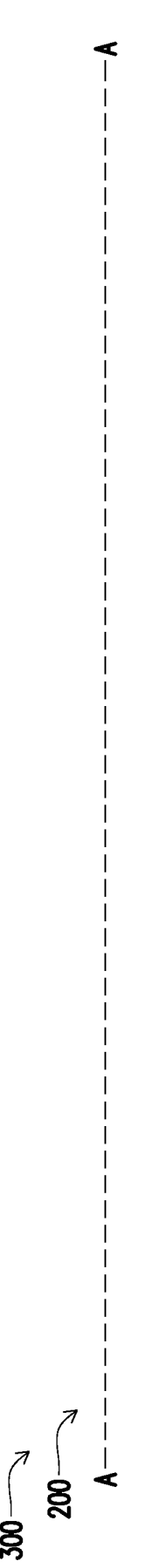
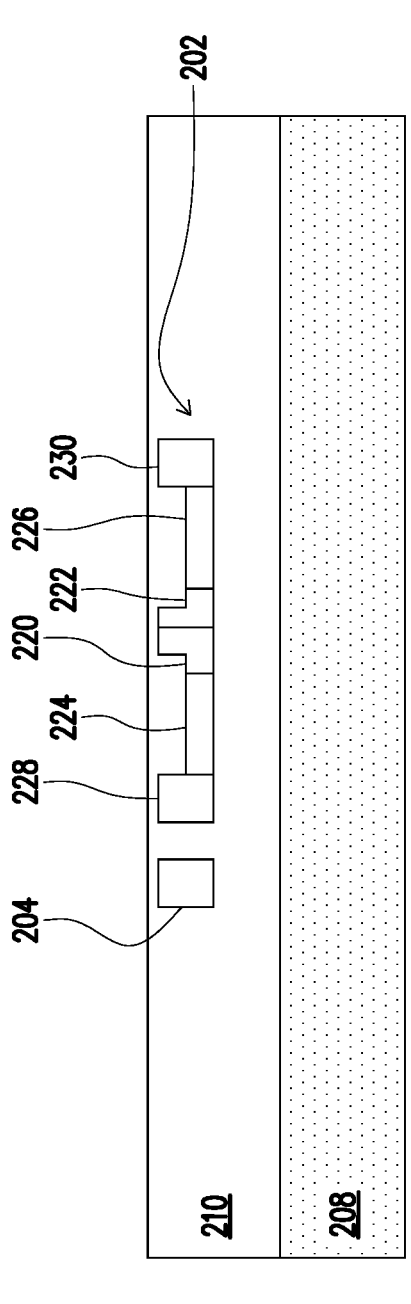
FIG. 3G

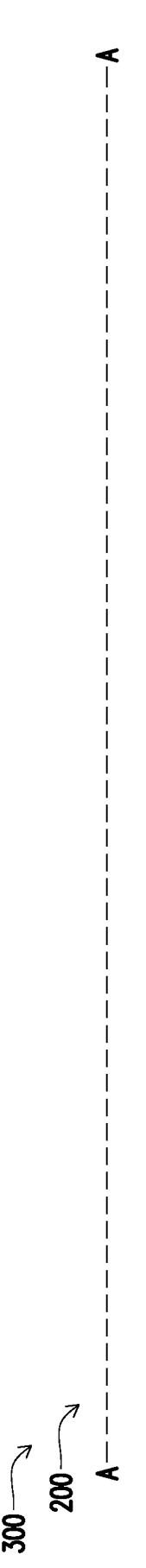
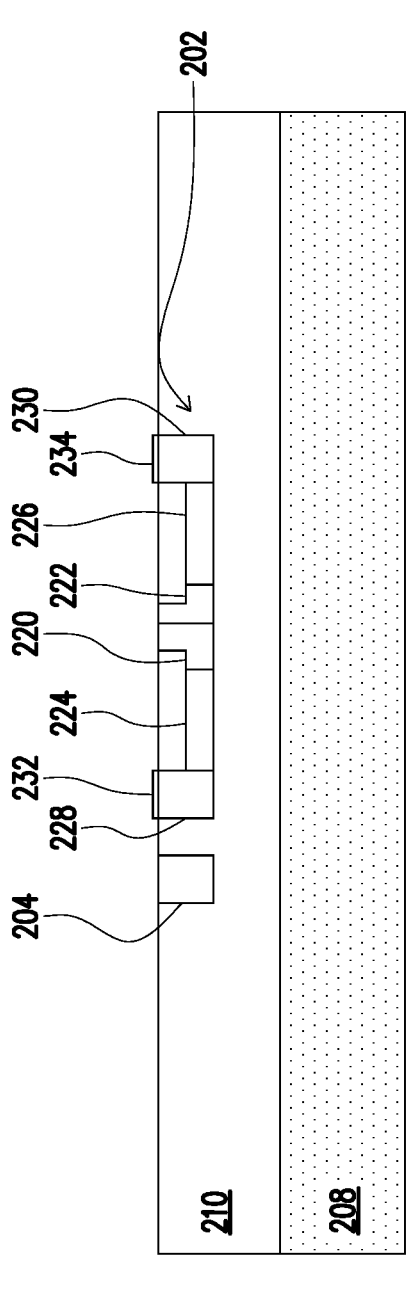
FIG. 3H

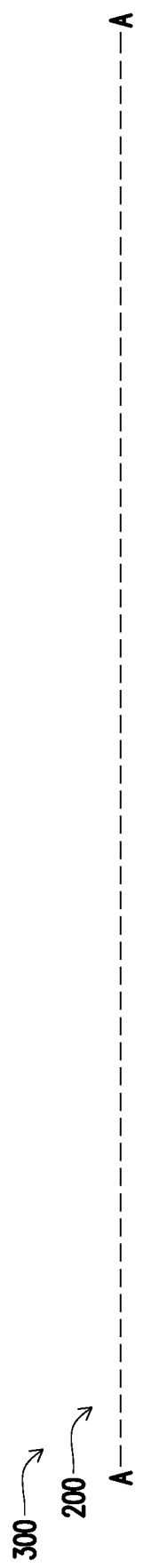
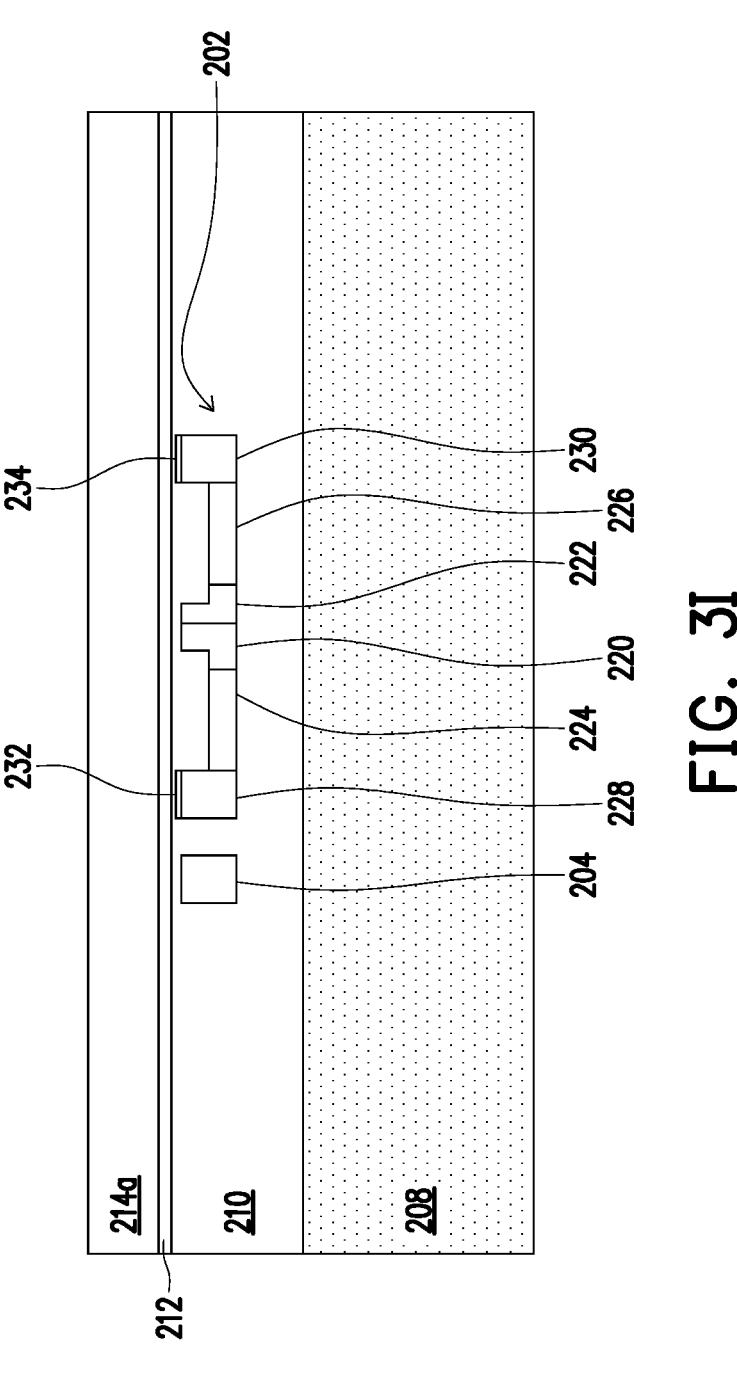
FIG. 3I

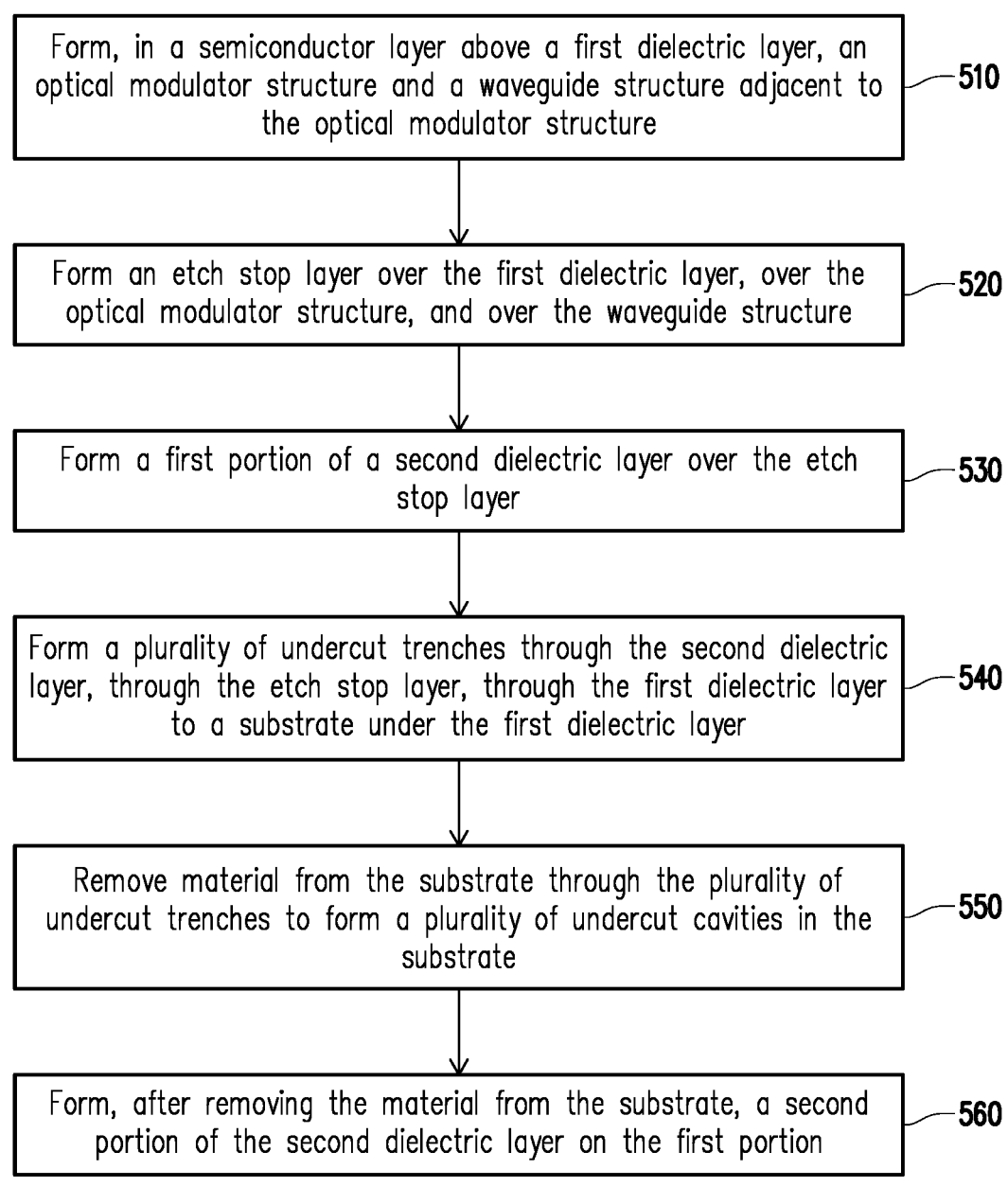

500

Form, in a semiconductor layer above a first dielectric layer, an optical modulator structure and a waveguide structure adjacent to the optical modulator structure — 510

Form an etch stop layer over the first dielectric layer, over the optical modulator structure, and over the waveguide structure — 520

Form a first portion of a second dielectric layer over the etch stop layer — 530

Form a plurality of undercut trenches through the second dielectric layer, through the etch stop layer, through the first dielectric layer to a substrate under the first dielectric layer — 540

Remove material from the substrate through the plurality of undercut trenches to form a plurality of undercut cavities in the substrate — 550

Form, after removing the material from the substrate, a second portion of the second dielectric layer on the first portion — 560

FIG. 5

SEMICONDUCTOR PHOTONICS DEVICE AND METHODS OF FORMATION

BACKGROUND

A semiconductor device may be configured to use optical signals for high speed and secure data transmission between integrated circuits and/or semiconductor dies of the semiconductor device. An optical signal may be transferred through a waveguide in the semiconductor device. The waveguide enables confinement of the optical signal, which may reduce optical loss and increase propagation efficiency for the optical signal. Data may be encoded into an optical signal by modulating light into optical pulses through an optical modulator. The optical pulses are then transferred to the waveguide for propagation to other regions of the semiconductor device.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 5 is a flowchart of an example process associated with forming a semiconductor photonics device.

DETAILED DESCRIPTION

Figure 1:
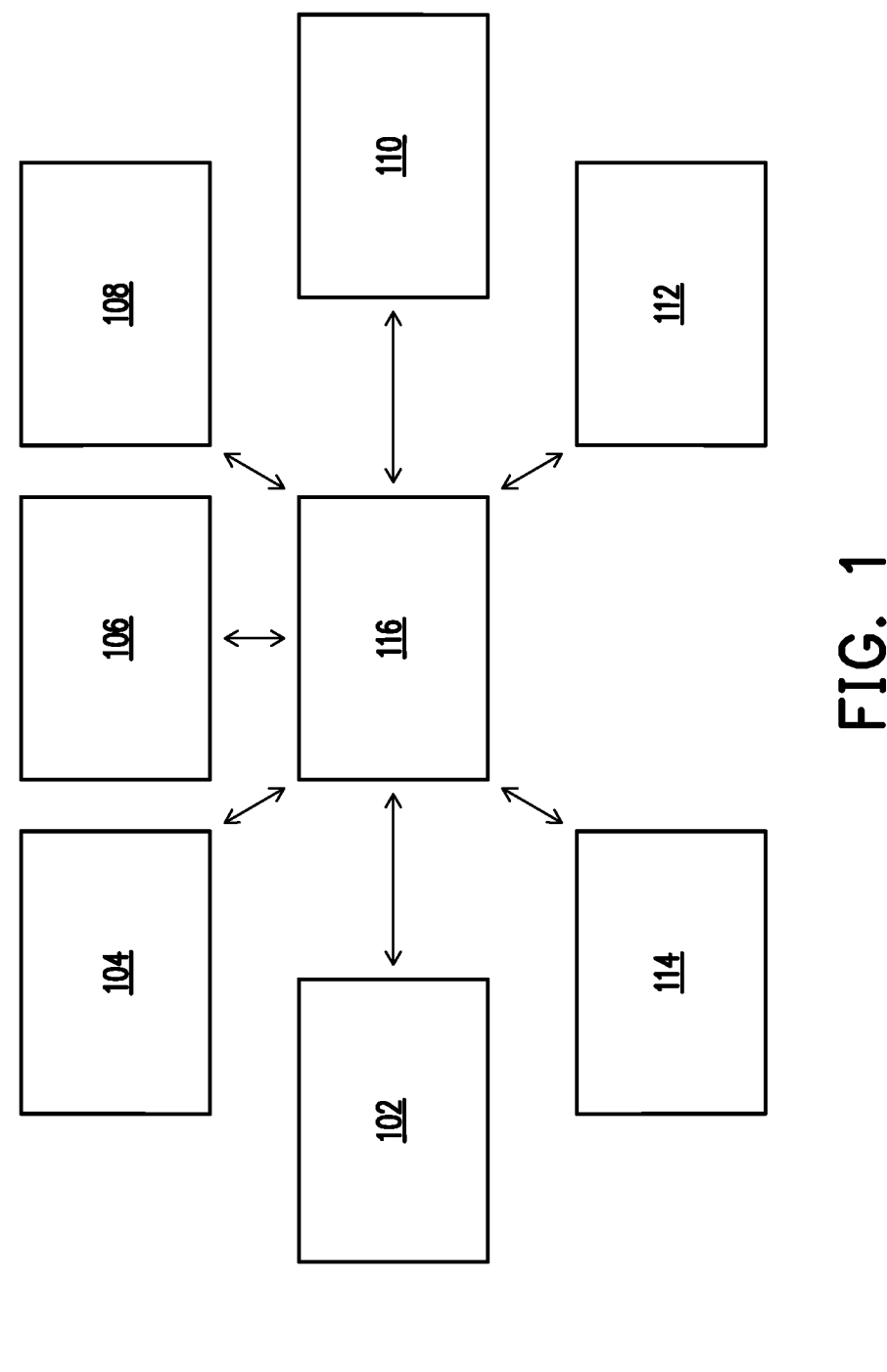
FIG. 1 is a diagram of an example environment in which systems and/or methods described herein may be implemented.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In some cases, a photonic integrated circuit that includes a waveguide and an optical modulator may be included in a dielectric region of a semiconductor device. The dielectric region may be located above a substrate of the semiconductor device. The resonant wavelengths of the optical modulator may be sensitive to variations in processes and operating temperatures. Thus, an integrated heater circuit may be included in the dielectric region to stabilize the operating temperature of the optical modulator, thereby stabilizing the operating performance of the optical modulator. However, the substrate under the dielectric region may reduce the efficiency of the integrated heater circuit in that the substrate may absorb heat generated by the integrated heater circuit (e.g., heat that could otherwise be used to heat the optical modulator).

High bandwidth and energy efficiency are performance metrics that may be tuned and/or optimized in the photonic integrated circuit. To increase the efficiency of the integrated heater circuit (and thus, the energy efficiency of the photonic integrated circuit), the substrate under the dielectric region may be etched such that air gaps are formed between the dielectric region and the substrate. These air gaps may reduce the amount of heat absorbed in the substrate, thereby increasing the efficiency of the integrated heater circuit.

To remove material from the substrate to form the air gaps, openings are formed to the substrate through the dielectric region and through other regions of the semiconductor device. These openings may result in exposure of the dielectric region and the other regions of the semiconductor device to environmental elements such as humidity and oxygen. Exposure to these environmental elements may result in the formation of defects in the dielectric region and the other regions of the semiconductor device, which may reduce the reliability of the semiconductor device, may decrease the performance of the photonic integrated circuit, and/or may result in failure of the semiconductor device, among other examples.

In some implementations described herein, a waveguide structure and an optical modulator structure of a photonic integrated circuit are formed in a dielectric region above a substrate of a semiconductor device. Openings are then formed through the dielectric region and to the substrate so that material can be removed from the substrate to form air gaps (referred to as undercut cavities) between the substrate and the dielectric region. The openings (referred to herein as undercut trenches) are then sealed by depositing dielectric material in the openings. Sealing the openings reduces the likelihood of exposure of the dielectric region and other regions of the semiconductor device to exposure to environmental elements such as humidity and oxygen. The reduced likelihood of exposure to these environmental elements, due to sealing the openings, may reduce the likelihood and/or rate of formation of defects in the dielectric region and the other regions of the semiconductor device. This may increase the reliability of the semiconductor device and/or may increase the performance of the photonic integrated circuit. Moreover, this may reduce the failure rate (and thus, may increase the yield) of semiconductor devices that include air gaps between a dielectric region and a substrate of the semiconductor devices.

FIG. 1 is a diagram of an example environment 100 in which systems and/or methods described herein may be implemented. As shown in FIG. 1, environment 100 may include a plurality of semiconductor processing tools 102-

114 and a wafer/die transport tool 116. The plurality of semiconductor processing tools 102-114 may include a deposition tool 102, an exposure tool 104, a developer tool 106, an etch tool 108, a planarization tool 110, a plating tool 112, an ion implantation tool 114, and/or another type of semiconductor processing tool. The tools included in example environment 100 may be included in a semiconductor clean room, a semiconductor foundry, a semiconductor processing facility, and/or manufacturing facility, among other examples.

The deposition tool 102 is a semiconductor processing tool that includes a semiconductor processing chamber and one or more devices capable of depositing various types of materials onto a substrate. In some implementations, the deposition tool 102 includes a spin coating tool that is capable of depositing a photoresist layer on a substrate such as a wafer. In some implementations, the deposition tool 102 includes a chemical vapor deposition (CVD) tool such as a plasma enhanced CVD (PECVD) tool, a low pressure CVD (LPCVD) tool, a high-density plasma CVD (HDP-CVD) tool, a sub-atmospheric CVD (SACVD) tool, an atomic layer deposition (ALD) tool, a plasma-enhanced atomic layer deposition (PEALD) tool, or another type of CVD tool. In some implementations, the deposition tool 102 includes a physical vapor deposition (PVD) tool, such as a sputtering tool or another type of PVD tool. In some implementations, the example environment 100 includes a plurality of types of deposition tools 102.

The exposure tool 104 is a semiconductor processing tool that is capable of exposing a photoresist layer to a radiation source, such as an ultraviolet light (UV) source (e.g., a deep UV light source, an extreme UV light (EUV) source, and/or the like), an x-ray source, an electron beam (e-beam) source, and/or the like. The exposure tool 104 may expose a photoresist layer to the radiation source to transfer a pattern from a photomask to the photoresist layer. The pattern may include one or more semiconductor device layer patterns for forming one or more semiconductor devices, may include a pattern for forming one or more structures of a semiconductor device, may include a pattern for etching various portions of a semiconductor device, and/or the like. In some implementations, the exposure tool 104 includes a scanner, a stepper, or a similar type of exposure tool.

The developer tool 106 is a semiconductor processing tool that is capable of developing a photoresist layer that has been exposed to a radiation source to develop a pattern transferred to the photoresist layer from the exposure tool 104. In some implementations, the developer tool 106 develops a pattern by removing unexposed portions of a photoresist layer. In some implementations, the developer tool 106 develops a pattern by removing exposed portions of a photoresist layer. In some implementations, the developer tool 106 develops a pattern by dissolving exposed or unexposed portions of a photoresist layer through the use of a chemical developer.

The etch tool 108 is a semiconductor processing tool that is capable of etching various types of materials of a substrate, wafer, or semiconductor device. For example, the etch tool 108 may include a wet etch tool, a dry etch tool, and/or the like. In some implementations, the etch tool 108 includes a chamber that is filled with an etchant, and the substrate is placed in the chamber for a particular time period to remove particular amounts of one or more portions of the substrate. In some implementations, the etch tool 108 may etch one or more portions of the substrate using a plasma etch or a plasma-assisted etch, which may involve using an ionized gas to isotropically or directionally etch the one or more portions.

The planarization tool 110 is a semiconductor processing tool that is capable of polishing or planarizing various layers of a wafer or semiconductor device. For example, a planarization tool 110 may include a chemical mechanical planarization (CMP) tool and/or another type of planarization tool that polishes or planarizes a layer or surface of deposited or plated material. The planarization tool 110 may polish or planarize a surface of a semiconductor device with a combination of chemical and mechanical forces (e.g., chemical etching and free abrasive polishing). The planarization tool 110 may utilize an abrasive and corrosive chemical slurry in conjunction with a polishing pad and retaining ring (e.g., typically of a greater diameter than the semiconductor device). The polishing pad and the semiconductor device may be pressed together by a dynamic polishing head and held in place by the retaining ring. The dynamic polishing head may rotate with different axes of rotation to remove material and even out any irregular topography of the semiconductor device, making the semiconductor device flat or planar.

The plating tool 112 is a semiconductor processing tool that is capable of plating a substrate (e.g., a wafer, a semiconductor device, and/or the like) or a portion thereof with one or more metals. For example, the plating tool 112 may include a copper electroplating device, an aluminum electroplating device, a nickel electroplating device, a tin electroplating device, a compound material or alloy (e.g., tin-silver, tin-lead, and/or the like) electroplating device, and/or an electroplating device for one or more other types of conductive materials, metals, and/or similar types of materials.

The ion implantation tool 114 is a semiconductor processing tool that is capable of implanting ions into a substrate. The ion implantation tool 114 may generate ions in an arc chamber from a source material such as a gas or a solid. The source material may be provided into the arc chamber, and an arc voltage is discharged between a cathode and an electrode to produce a plasma containing ions of the source material. One or more extraction electrodes may be used to extract the ions from the plasma in the arc chamber and accelerate the ions to form an ion beam. The ion beam may be directed toward the substrate such that the ions are implanted below the surface of the substrate.

The wafer/die transport tool 116 may be included in a cluster tool or another type of tool that includes a plurality of processing chambers, and may be configured to transport substrates and/or semiconductor devices between the plurality of processing chambers, to transport substrates and/or semiconductor devices between a processing chamber and a buffer area, to transport substrates and/or semiconductor devices between a processing chamber and an interface tool such as an equipment front end module (EFEM), and/or to transport substrates and/or semiconductor devices between a processing chamber and a transport carrier (e.g., a front opening unified pod (FOUP)), among other examples. In some implementations, a wafer/die transport tool 116 may be included in a multi-chamber (or cluster) deposition tool 102, which may include a pre-clean processing chamber (e.g., for cleaning or removing oxides, oxidation, and/or other types of contamination or byproducts from a substrate and/or semiconductor device) and a plurality of types of deposition processing chambers (e.g., processing chambers for depositing different types of materials, processing chambers for performing different types of deposition operations).

In some implementations, one or more of the semiconductor processing tools 102-114 and/or the wafer/die transport tool 116 may perform one or more semiconductor processing operations described herein. For example, one or more of the semiconductor processing tools 102-114 and/or the wafer/die transport tool 116 may form, in a semiconductor layer above a first dielectric layer, an optical modulator structure and a waveguide structure adjacent to the optical modulator structure; form an etch stop layer over the first dielectric layer, over the optical modulator structure, and over the waveguide structure; form a first portion of a second dielectric layer over the etch stop layer; form a plurality of undercut trenches through the second dielectric layer, through the etch stop layer, through the first dielectric layer to a substrate under the first dielectric layer; remove material from the substrate through the plurality of undercut trenches to form a plurality of undercut cavities in the substrate; and/or form, after removing the material from the substrate, a second portion of the second dielectric layer on the first portion, where the second portion seals the plurality of undercut trenches, among other examples. One or more of the semiconductor processing tools 102-114 and/or the wafer/die transport tool 116 may perform other semiconductor processing operations described herein, such as in connection with FIGS. 3A-3S and/or 5, among other examples.

The number and arrangement of devices shown in FIG. 1 are provided as one or more examples. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the example environment 100 may perform one or more functions described as being performed by another set of devices of the example environment 100.

Figure 2A:
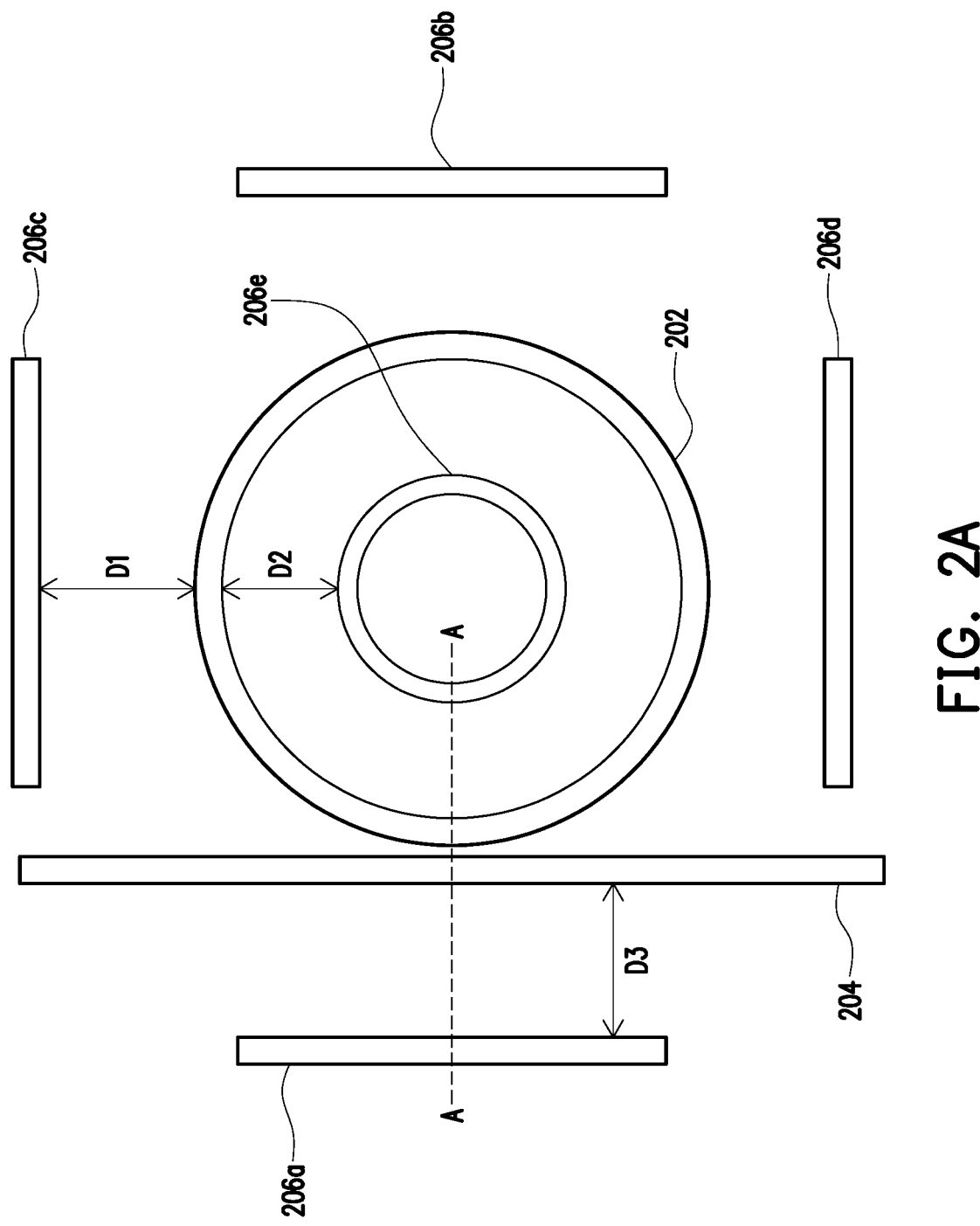
FIGS. 2A and 2B are diagrams of an example semiconductor device described herein.
Figure 2B:
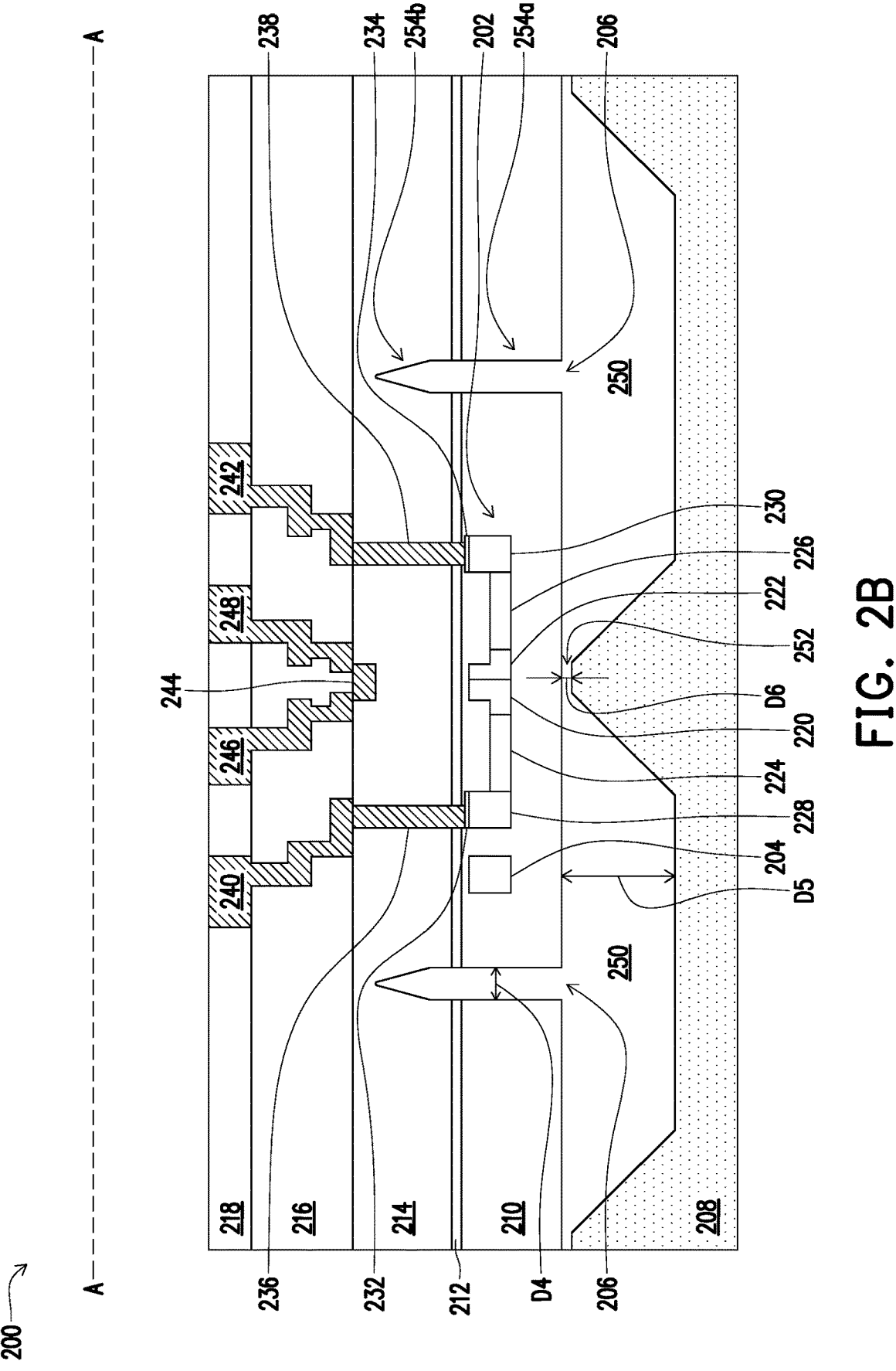

FIGS. 2A and 2B are diagrams of an example semiconductor device 200 described herein. The semiconductor device 200 may include a semiconductor photonics device and/or another type of semiconductor device that includes one or more photonic integrated circuits.

FIG. 2A illustrates a top-down view of the semiconductor device 200. The semiconductor device 200 may be configured to use optical signals for high speed and secure data transmission between integrated circuits and/or semiconductor dies of the semiconductor device 200. Accordingly, the semiconductor device 200 may include an optical modulator structure 202 and a waveguide structure 204. An optical signal may be transferred through the waveguide structure 204 in the semiconductor device 200. The waveguide structure 204 enables confinement of the optical signal, which may reduce optical loss and increase propagation efficiency for the optical signal. Data may be encoded into an optical signal by modulating light into optical pulses in the optical modulator structure 202. The optical pulses are then transferred to the waveguide structure 204 for propagation to other regions of the semiconductor device 200. The optical modulator structure 202 and the waveguide structure 204 may be adjacent and/or side by side in the semiconductor device 200 to enable coupling of the optical signal from the optical modulator structure 202 to the waveguide structure 204 (and vice-versa for demodulation of an optical signal).

The optical modulator structure 202 may include an approximately circular shape, and may be referred to as a micro-ring modulator (MRM). The optical modulator structure 202 may function as a resonance chamber and may modulate an input signal from a light source to generate an optical signal (e.g., a modulated light signal). The optical signal may couple to the waveguide structure 204 based on the optical signal satisfying a threshold modulation frequency and/or based on the optical signal satisfying a threshold signal intensity. The waveguide structure 204 may facilitate propagation of the optical signal to another device or area in the semiconductor device 200.

As further shown in FIG. 2A, the semiconductor device 200 may include one or more undercut trenches, such as an undercut trench 206a, an undercut trench 206b, an undercut trench 206c, an undercut trench 206d, and/or an undercut trench 206e, among other examples. The undercut trench 206a may be located adjacent to the waveguide structure 204 on a first side of the waveguide structure 204 opposing a second side of the waveguide structure 204 to which the optical modulator structure 202 is adjacent. The undercut trench 206b may be located adjacent to the optical modulator structure 202 on a first side of the optical modulator structure 202 opposing a second side of the optical modulator structure 202 to which the waveguide structure 204 is adjacent. The undercut trench 206c may be located on a side of the optical modulator structure 202 that is approximately orthogonal to a side of the optical modulator structure 202 to which the undercut trench 206b is adjacent. The undercut trench 206d may be located on a side of the optical modulator structure 202 that is approximately orthogonal to a side of the optical modulator structure 202 to which the undercut trench 206b is adjacent, is opposing a side of the optical modulator structure 202 to which the undercut trench 206c is adjacent. The undercut trench 206e may be included within a perimeter of the optical modulator structure 202.

An undercut trench may refer to an unfilled trench (e.g., a trench that does not include any material other than a gas such as air) that is formed in one or more layers of the semiconductor device 200. In some implementations, an undercut trench may be an elongated trench in the top-down view of the semiconductor device 200, and may conform to the approximate shape of the waveguide structure 204 in the top-down view of the semiconductor device 200. Examples include the undercut trenches 206a-206d. In some implementations, an undercut trench may include a circular shape or a ring shape that conforms to the approximate shape of the optical modulator structure 202. An example includes the undercut trench 206e. In some implementations, the semiconductor device 200 may include one or more undercut trenches that conform to another shape.

As described herein, the undercut trenches 206a-206e may be included in the semiconductor device 200 to provide and/or to increase thermal isolation of the optical modulator structure 202 from other areas or portions of the semiconductor device 200. The optical modulator structure 202 may be surrounded by one or more layers of the semiconductor device 200. The undercut trenches 206a-206e may be included in the one or more layers to reduce and/or resist the transfer of heat away from the optical modulator structure 202 through the one or more layers. The undercut trenches 206a-206e may function as a thermal barrier that promotes the confinement of heat in the one or more layers only in portions that are proximate to or next to the optical modulator structure 202. Moreover, undercut trenches 206a-206e may provide a path through which material from an underlying substrate may be removed from under the optical modulator structure 202 to provide additional thermal isolation. In this way, the undercut trenches 206a-206e provide and/or promote stability in the operating temperature of the optical modulator structure 202, which may increase the operating efficiency of the optical modulator structure 202.

As further shown in FIG. 2A, the semiconductor device 200 may include one or more dimensions, such as a dimension D1, a dimension D2, and/or a dimension D3, among other examples. The dimension D1 may correspond to a distance (or a spacing) between an undercut trench (e.g., the undercut trench 206c or another undercut trench) and an outer wall of the optical modulator structure 202. In some implementations, the dimension D1 may be included in a range of approximately 2 microns to approximately 6 microns to reduce the likelihood of increasing mechanical stresses on the optical modulator structure 202 while enabling material from the underlying substrate to be removed from under the optical modulator structure 202. However, other values for the range are within the scope of the present disclosure.

The dimension D2 may correspond to a distance (or a spacing) between an undercut trench (e.g., the undercut trench 206e or another undercut trench) and an inner wall of the optical modulator structure 202. In some implementations, the dimension D2 may be included in a range of approximately 2 microns to approximately 6 microns to reduce the likelihood of increasing mechanical stresses on the optical modulator structure 202 while enabling material from the underlying substrate to be removed from under the optical modulator structure 202. However, other values for the range are within the scope of the present disclosure.

The dimension D3 may correspond to a distance (or a spacing) between an undercut trench (e.g., the undercut trench 206a or another undercut trench) and an outer wall of the waveguide structure 204. In some implementations, the dimension D3 may be included in a range of approximately 2 microns to approximately 6 microns to reduce the likelihood of increasing mechanical stresses on the waveguide structure 204 while enabling material from the underlying substrate to be removed from under the optical modulator structure 202. However, other values for the range are within the scope of the present disclosure.

FIG. 2B illustrates a cross-sectional view of the semiconductor device 200 along the line A-A in FIG. 2A. As shown in FIG. 2B, the semiconductor device 200 may include a substrate 208. The substrate 208 may be formed of silicon (Si), a material including silicon, a III-V compound semiconductor material such as gallium arsenide (GaAs), and/or another type of semiconductor material.

The semiconductor device 200 may further include a first dielectric layer 210 over the substrate 208. The first dielectric layer may include one or more dielectric materials, such as a silicon oxide ($SiO_x$), a silicon nitride ($Si_xN_y$), a silicon oxynitride (SiON), tetraethyl orthosilicate oxide, phosphosilicate glass (PSG), borophosphosilicate glass (BPSG), fluorinated silica glass (FSG), carbon doped silicon oxide, and/or another dielectric material. The optical modulator structure 202 and the waveguide structure 204 may be included in the first dielectric layer 210.

The semiconductor device 200 may include an etch stop layer 212 over and/or on the first dielectric layer 210. The etch stop layer 212 may include one or more dielectric materials, such as a silicon oxide ($SiO_x$), a silicon nitride ($Si_xN_y$), a silicon oxynitride (SiON), tetraethyl orthosilicate oxide, phosphosilicate glass (PSG), borophosphosilicate glass (BPSG), fluorinated silica glass (FSG), carbon doped silicon oxide, and/or another dielectric material.

The semiconductor device 200 may include a second dielectric layer 214 over and/or on the etch stop layer 212. The second dielectric layer 214 may include one or more dielectric materials, such as a silicon oxide ($SiO_x$), a silicon nitride ($Si_xN_y$), a silicon oxynitride (SiON), tetraethyl orthosilicate oxide, phosphosilicate glass (PSG), borophosphosilicate glass (BPSG), fluorinated silica glass (FSG), carbon doped silicon oxide, and/or another dielectric material. The second dielectric layer 214 may be referred to as an inter-layer dielectric (ILD) layer. In some implementations, the semiconductor device 200 includes a plurality of ILD layers and/or a plurality of etch stop layers 212.

In some implementations, the first dielectric layer 210 and the second dielectric layer 214 may include the same or similar dielectric materials. In some implementations, the etch stop layer 212 may include one or more dielectric materials that are different from the one or more dielectric materials included in the first dielectric layer 210 and in the second dielectric layer 214. This may enable the etch stop layer 212 to provide etch selectivity between the etch stop layer 212 and the first dielectric layer 210 and the second dielectric layer 214.

The semiconductor device 200 may include a third dielectric layer 216. The third dielectric layer 216 may be included over and/or on the second dielectric layer 214. The third dielectric layer 216 may include one or more dielectric materials, such as a silicon oxide ($SiO_x$), a silicon nitride ($Si_xN_y$), a silicon oxynitride (SiON), tetraethyl orthosilicate oxide, phosphosilicate glass (PSG), borophosphosilicate glass (BPSG), fluorinated silica glass (FSG), carbon doped silicon oxide, and/or another dielectric material. The third dielectric layer 216 may be referred to as an inter-metal dielectric (IMD) layer. In some implementations, the semiconductor device 200 includes a plurality of IMD layers. In some implementations, the semiconductor device 200 includes one or more etch stop layers between two or more of the plurality of IMD layers.

The semiconductor device 200 may include a passivation layer 218 over and/or on the third dielectric layer 216. In some implementations, the passivation layer 218 includes one or more dielectric materials, such as a silicon oxide ($SiO_x$), a silicon nitride ($Si_xN_y$), a silicon oxynitride (SiON), tetraethyl orthosilicate oxide, phosphosilicate glass (PSG), borophosphosilicate glass (BPSG), fluorinated silica glass (FSG), carbon doped silicon oxide, and/or another dielectric material. In some implementations, the passivation layer 218 includes one or more polymer layers.

As further shown in FIG. 2B, the optical modulator structure 202 may include one or more doped regions. The one or more doped regions may facilitate and/or promote the flow of electrons in the optical modulator structure 202 and/or may facilitate and/or promote formation of an optical signal from an electrical signal. For example, the one or more doped regions may be configured as a p-n junction that is configured to generate an optical signal.

The one or more doped regions may include silicon (and/or another semiconductor material) that is doped with one or more types of dopants, such as n-type dopants and/or p-type dopants. For example, the optical modulator structure 202 may include a p-doped region 220 that is doped with p-type ions. The p-type ions may include a p-type material (e.g., boron (B) or germanium (Ge), among other examples). As another example, the optical modulator structure 202 may include an n-doped region 222 that is doped with n-type ions. The n-type ions may include an n-type material (e.g., phosphorous (P) or arsenic (As), among other examples). The n-doped region 222 and the p-doped region 220 may be adjacent and/or physically coupled. Moreover, the n-doped region 222 and the p-doped region 220 may be located at a center of the optical modulator structure 202.

The optical modulator structure 202 may further include a p doped region 224 adjacent to the p-doped region 220. The p doped region 224 may include p-type ions including a p-type material (e.g., boron (B) or germanium (Ge), among other examples). The optical modulator structure 202 may further include an n doped region 226 adjacent to the n-doped region 222. The n doped region 226 may include n-type ions including an n-type material (e.g., phosphorous (P) or arsenic (As), among other examples).

The optical modulator structure 202 may further include a p+ doped region 228 adjacent to the p doped region 224. The p+ doped region 228 may include p-type ions including a p-type material (e.g., boron (B) or germanium (Ge), among other examples). The optical modulator structure 202 may further include an n+ doped region 230 adjacent to the n doped region 226. The n+ doped region 230 may include n-type ions including an n-type material (e.g., phosphorous (P) or arsenic (As), among other examples).

The p-doped region 220, the p doped region 224, and the p+ doped region 228 may each include a different p-type dopant concentration. The different p-type dopant concentrations result in a dopant gradient between the center of the optical modulator structure 202 and an outer wall of the optical modulator structure 202. The p-type dopant concentration in the p+ doped region 228 may be greater relative to the p-type dopant concentration in the p doped region 224, and the p-type dopant concentration in the p doped region 224 may be greater relative to the p-type dopant concentration in the p-doped region 220. For example, the p-doped region 220 may include a p-type dopant concentration that is included in a range of approximately $1 \times E^{17}$ p-type ions/$cm^3$ to approximately $5 \times E^{18}$ p-type ions/$cm^3$. However, other values for the range are within the scope of the present disclosure. As another example, the p doped region 224 may include a p-type dopant concentration that is included in a range of approximately $1 \times E^{19}$ p-type ions/$cm^3$ to approximately $1 \times E^{20}$ p-type ions/$cm^3$. However, other values for the range are within the scope of the present disclosure. As another example, the p+ doped region 228 may include a p-type dopant concentration that is included in a range of approximately $1 \times E^{20}$ p-type ions/$cm^3$ to approximately $5 \times E^{20}$ p-type ions/$cm^3$. However, other values for the range are within the scope of the present disclosure.

The n-doped region 222, the n doped region 226, and the n+ doped region 230 may each include a different n-type dopant concentration. The different n-type dopant concentrations result in a dopant gradient between the center of the optical modulator structure 202 and an inner wall of the optical modulator structure 202. The n-type dopant concentration in the n+ doped region 230 may be greater relative to the n-type dopant concentration in the n doped region 226, and the n-type dopant concentration in the n doped region 226 may be greater relative to the n-type dopant concentration in the n-doped region 222. For example, the n-doped region 222 may include an n-type dopant concentration that is included in a range of approximately $1 \times E^{17}$ n-type ions/$cm^3$ to approximately $5 \times E^{18}$ n-type ions/$cm^3$. However, other values for the range are within the scope of the present disclosure. As another example, the n doped region 226 may include an n-type dopant concentration that is included in a range of approximately $1 \times E^{19}$ n-type ions/$cm^3$ to approximately $1 \times E^{20}$ n-type ions/$cm^3$. However, other values for the range are within the scope of the present disclosure. As another example, the n+ doped region 230 may include an n-type dopant concentration that is included in a range of approximately $1 \times E^{20}$ n-type ions/$cm^3$ to approximately $5 \times E^{20}$ n-type ions/$cm^3$. However, other values for the range are within the scope of the present disclosure.

As further shown in FIG. 2B, a silicide layer 232 may be included over and/or on the optical modulator structure 202, and a silicide layer 234 may be included over and/or on the optical modulator structure 202. The silicide layer 232 may be included over and/or on the p+ doped region 228 of the optical modulator structure 202, and the silicide layer 234 may be included over and/or on the n+ doped region 230 of the optical modulator structure 202. The silicide layer 232 and the silicide layer 234 may each include a metal silicide layer such as a titanium silicide and/or another type of metal silicide.

The silicide layer 232 may be included to achieve a sufficiently low contact resistance between the p+ doped region 228 of the optical modulator structure 202 and a contact structure 236 that is electrically coupled with the optical modulator structure 202. The silicide layer 234 may be included to achieve a sufficiently low contact resistance between the n+ doped region 230 of the optical modulator structure 202 and a contact structure 238 that is electrically coupled with the optical modulator structure 202.

The contact structure 236 and the contact structure 238 may each be included in, and may extend through, the second dielectric layer 214 and the etch stop layer 212. The contact structure 236 and the contact structure 238 may each extend into the first dielectric layer 210 to the optical modulator structure 202. The contact structure 236 and the contact structure 238 may each include tungsten (W), cobalt (Co), ruthenium (Ru), titanium (Ti), aluminum (Al), copper (Cu) or gold (Au), among other examples of conductive materials. The contact structure 236 and the contact structure 238 may each include vias, trenches, contact plugs, and/or another type of conductive structures.

The contact structure 236 may be electrically coupled and/or physically coupled with one or more metallization layers 240. The contact structure 238 may be electrically coupled and/or physically coupled with one or more metallization layers 242. The metallization layer(s) 240 and the metallization layer(s) 242 may each be included in, and may extend through, the passivation layer 218 and the third dielectric layer 216. The metallization layer(s) 240 and the metallization layer(s) 242 may each include tungsten (W), cobalt (Co), ruthenium (Ru), titanium (Ti), aluminum (Al), copper (Cu) or gold (Au), among other examples of conductive materials. The metallization layer(s) 240 and the metallization layer(s) 242 may each include vias, trenches, contact plugs, and/or another type of metallization layers.

As further shown in FIG. 2B, the semiconductor device 200 may include a heater element 244. As described above, the resonant wavelengths of the optical modulator structure 202 may be sensitive to variations in operating temperature. Thus, the heater element 244 may be configured to stabilize the operating temperature of the optical modulator structure 202 during operation of the optical modulator structure 202. In particular, the heater element 244 may heat (e.g., may increase the temperature of) the optical modulator structure 202 to an operating temperature setpoint, thereby stabilizing the operating performance of the optical modulator structure 202. The heater element 244 may include tungsten (W), titanium nitride (TiN), and/or another material that is capable of radiating heat into the second dielectric layer 214, into the etch stop layer 212, and/or into the first dielectric layer 210 to heat the optical modulator structure 202.

The heater element 244 may be included in the second dielectric layer 214 above the optical modulator structure 202. In general, the heater element 244 may be located adjacent to the optical modulator structure 202, which may include horizontal adjacency, vertical adjacency, or a combination thereof.

The heater element 244 may be electrically coupled and/or physically coupled with one or more metallization layers 246 and one or more metallization layers 248. The metallization layer(s) 246 and the metallization layer(s) 248 may each be included in, and may extend through, the passivation layer 218 and the third dielectric layer 216. The metallization layer(s) 246 and the metallization layer(s) 248 may each include tungsten (W), cobalt (Co), ruthenium (Ru), titanium (Ti), aluminum (Al), copper (Cu) or gold (Au), among other examples of conductive materials. The metallization layer(s) 246 and the metallization layer(s) 248 may each include vias, trenches, contact plugs, and/or another type of metallization layers.

In some cases, the substrate 208 under the first dielectric layer 210 may reduce the efficiency of the heater element 244 for heating the optical modulator structure 202. In particular, the substrate 208 may absorb heat that is generated by the heater element 244. The heat absorbed in the substrate 208 may otherwise be used to heat the optical modulator structure 202, thereby resulting in wasted electrical energy and thermal energy in the semiconductor device 200.

To increase the efficiency of the heater element 244 (and thus, the energy efficiency of the photonic integrated circuit included in the semiconductor device 200), the substrate 208 under the first dielectric layer 210 include one or more undercut cavities between the substrate 208 and the first dielectric layer 210. In particular, the one or more undercut cavities 250 may be located under the optical modulator structure 202 and prevent the substrate 208 from physically touching the first dielectric layer 210 under the optical modulator structure 202 and in other areas proximate to the optical modulator structure 202. An undercut cavity 250 may refer to an area in the substrate 208 in which material from the substrate 208 was removed such that the area does not include any material other than a gas such as air. The undercut cavities 250 may function as a thermal barrier that promotes the confinement of heat near the optical modulator structure 202. Thus, the undercut cavities 250 may reduce the amount of heat absorbed in the substrate 208, thereby increasing the energy efficiency of the heater element 244.

As described herein, the undercut cavities 250 may be formed by removing material from the substrate 208 through the undercut trenches 206. The undercut trenches 206 may be formed through a portion of the second dielectric layer 214, through the etch stop layer 212, and through the first dielectric layer 210 to the substrate 208. Then, material may be removed from the substrate 208 through the undercut trenches 206 to form the undercut cavities 250. In some implementations, material is removed from the substrate 208 through the undercut trenches 206 until adjacent undercut cavities 250 are connected by an airgap spacer region 252 under the optical modulator structure 202. The formation of the airgap spacer region 252 under the optical modulator structure 202 may increase the likelihood that a sufficient amount of material is removed the substrate 208 so that the substrate 208 is no longer in physical contact with the first dielectric layer 210 under the optical modulator structure 202.

The undercut trenches 206 may be formed at a time or a stage in the process of manufacturing the semiconductor device 200 that enables the undercut trenches 206 to be sealed by one or more layers in the semiconductor device 200 prior to completion of the semiconductor device 200.

For example, the undercut trenches 206 may be formed prior to the full formation of the second dielectric layer 214, prior to formation of the third dielectric layer 216, and/or prior to formation of the passivation layer 218. This enables the undercut trenches 206 to be capped off and closed up by deposition of a second portion of the second dielectric layer 214. This reduces the likelihood and/or prevents exposure of one or more portions of the semiconductor device 200 to humidity and/or another contaminant through the undercut trenches 206 relative to forming the undercut trenches 206 through the third dielectric layer 216 and the passivation layer 218 after formation of the third dielectric layer 216 and the passivation layer 218.

The shape and/or profile of the undercut trenches 206 may results from the time or the stage in the process of manufacturing the semiconductor device 200 in which the undercut trenches 206 are formed. For example, because the undercut trenches 206 may be formed prior to full formation of the second dielectric layer 214, and because the undercut trenches 206 may be sealed by a remaining portion of the second dielectric layer 214 that is deposited after formation of the undercut trenches 206, the undercut trenches 206 do not fully extend through the second dielectric layer 214. In particular, an undercut trench 206 may fully extend through the first dielectric layer 210 (e.g., may fully extend between a top surface of the first dielectric layer 210 and a bottom surface of the first dielectric layer 210), and may fully extend through the etch stop layer 212 (e.g., may fully extend between a top surface of the etch stop layer 212 and a bottom surface of the etch stop layer 212). However, the undercut trench 206 may extend into only a portion of the second dielectric layer 214 and may terminate in the second dielectric layer 214. For example, the undercut trench 206 may extend from a bottom surface of the second dielectric layer 214 into only a portion of the second dielectric layer 214, and may terminate below the top surface of the second dielectric layer 214. Thus, the undercut trench 206 is not exposed through the second dielectric layer 214 and is instead sealed by the second dielectric layer 214.

Moreover, an undercut trench 206 may include an approximately straight-walled portion 254a and a tapered portion 254b above the approximately straight-walled portion 254a. In the approximately straight-walled portion 254a, the sidewalls of the undercut trench 206 are approximately parallel. In the tapered portion 254b the sidewalls of the undercut trench 206 are angled and converge at a point in the second dielectric layer 214.

As further shown in FIG. 2B, the semiconductor device 200 may include one or more additional dimensions, such as a dimension D4, a dimension D5, and/or a dimension D6, among other examples. The dimension D4 may correspond to a cross-sectional width of an undercut trench 206. The dimension D4 may correspond to a cross-sectional width of the undercut trench 206. In some implementations, the dimension D4 is included in a range of approximately 0.5 microns to approximately 2 microns to enable the undercut trench 206 to be fully formed to the substrate 208 while enabling the undercut trench 206 to be subsequently sealed. However, other values for the range are within the scope of the present disclosure.

The dimension D5 may correspond to a depth of an undercut cavity 250. The depth of the undercut cavity 250 may correspond to a distance between a bottom surface of the undercut cavity 250 (e.g., at a deepest part of the undercut cavity 250) and a bottom surface of the first dielectric layer 210. The dimension D6 may correspond to a thickness or depth of an airgap spacer region 252 between the substrate 208 and the first dielectric layer 210, where the airgap spacer region 252 is connected with a first undercut cavity 250 and a second undercut cavity 250 of the one or more undercut cavities.

In some implementations, the dimension D5 may be included in a range of approximately 3 microns to approximately 10 microns to facilitate formation of the airgap spacer region 252 (e.g., so that the substrate 208 and first dielectric layer 210 are not in physical contact under the optical modulator structure 202) while facilitating a semiconductor manufacturing throughput parameter (e.g., a particular quantity of wafers per hour, a particular quantity of dies per hour) to be achieved. However, other values for the range are within the scope of the present disclosure.

In some implementations, the dimension D6 may be included in a range of approximately 1 micron to approximately 5 microns so that the substrate 208 and first dielectric layer 210 are not in physical contact under the optical modulator structure 202 and so as to promote thermal isolation between the first dielectric layer 210 and the substrate 208, while facilitating a semiconductor manufacturing throughput parameter (e.g., a particular quantity of wafers per hour, a particular quantity of dies per hour) to be achieved. However, other values for the range are within the scope of the present disclosure.

Accordingly, the semiconductor device 200 may include a substrate 208, a first dielectric layer 210 over the substrate 208, an etch stop layer 212 over the first dielectric layer 210, a second dielectric layer 214 over the etch stop layer 212, an optical modulator structure 202 in the first dielectric layer 210, a waveguide structure 204 in the first dielectric layer 210 and adjacent to the optical modulator structure 202, one or more undercut cavities 250 in the substrate 208, and one or more undercut trenches 206 that extend from the one or more undercut cavities 250 through the first dielectric layer 210, through the etch stop layer 212, and terminate in the second dielectric layer 214. The one or more undercut trenches 206 may be located adjacent to at least one of the optical modulator structure 202 or the waveguide structure 204. The semiconductor device may further include an airgap spacer region 252 between the substrate 208 and the first dielectric layer 210, where the airgap spacer region 252 is connected with a first undercut cavity 250 and a second undercut cavity 250 of the one or more undercut cavities 250. The one or more undercut cavities 250 may be located under at least one of the optical modulator structure 202 or the waveguide structure 204.

As indicated above, FIGS. 2A and 2B are provided as an example. Other examples may differ from what is described with regard to FIGS. 2A and 2B.

Figure 3B:
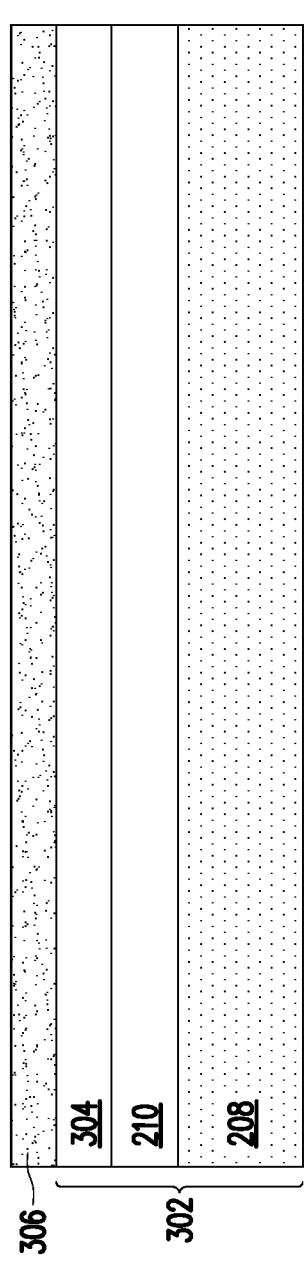
FIGS. 3A-3S are diagrams of an example implementation of forming the semiconductor device (or a portion thereof) described herein.
Figure 3D:
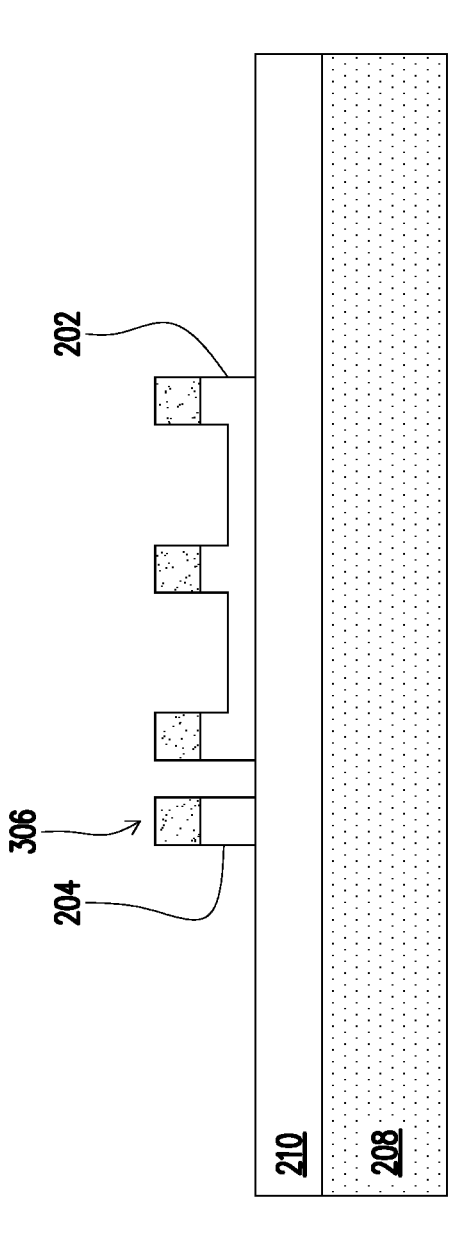
Figure 3J:
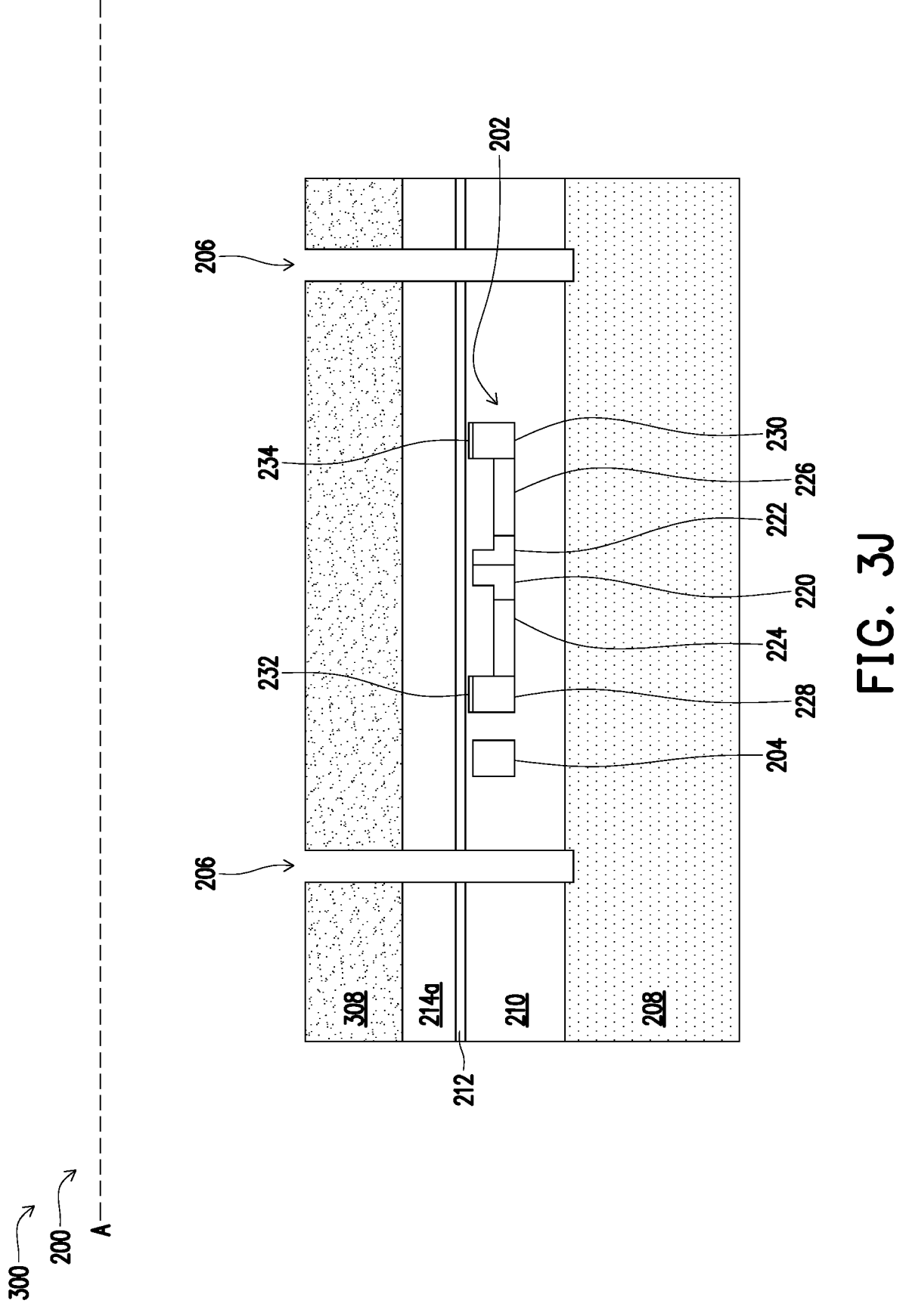
Figure 3K:
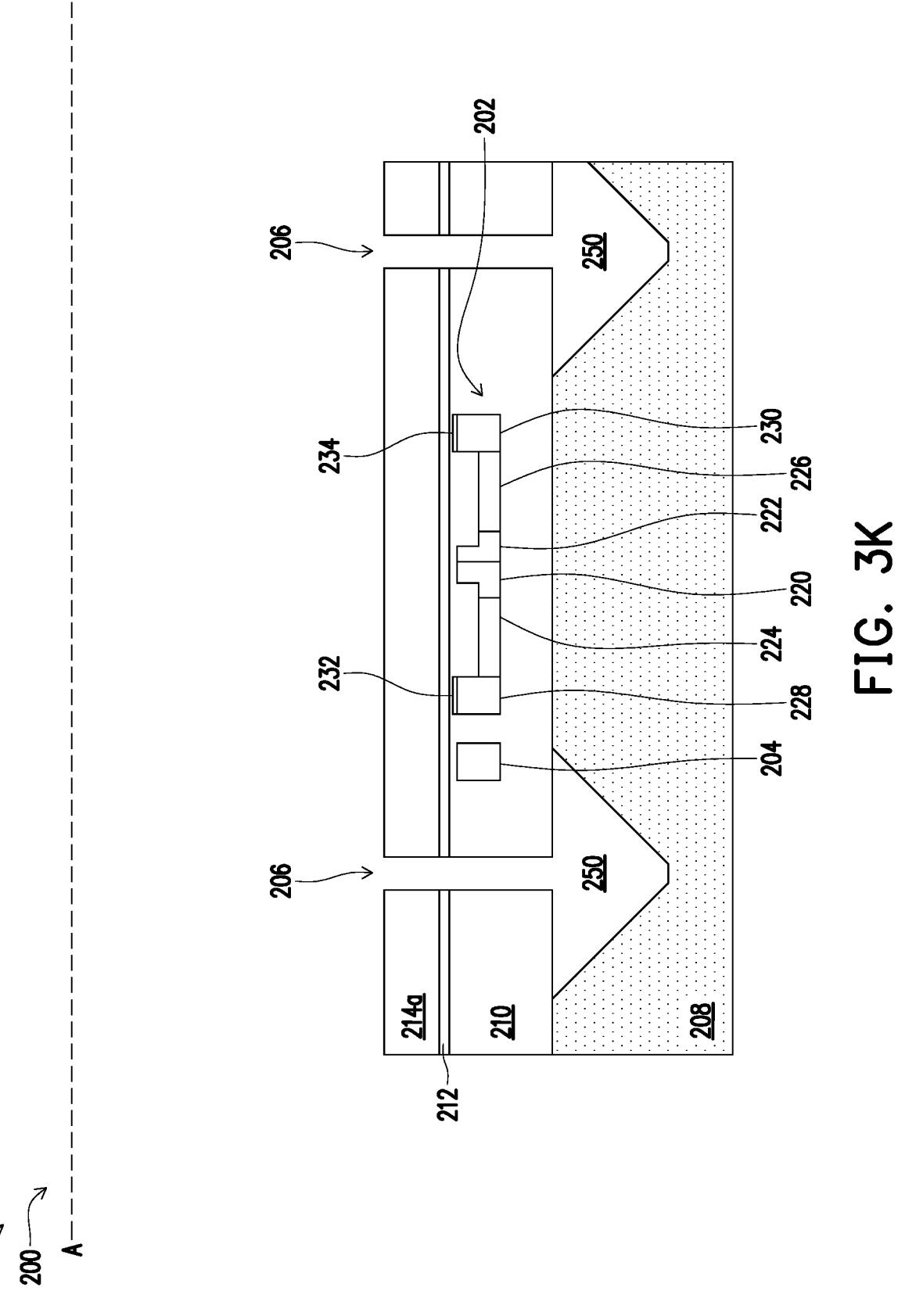
Figure 3L:
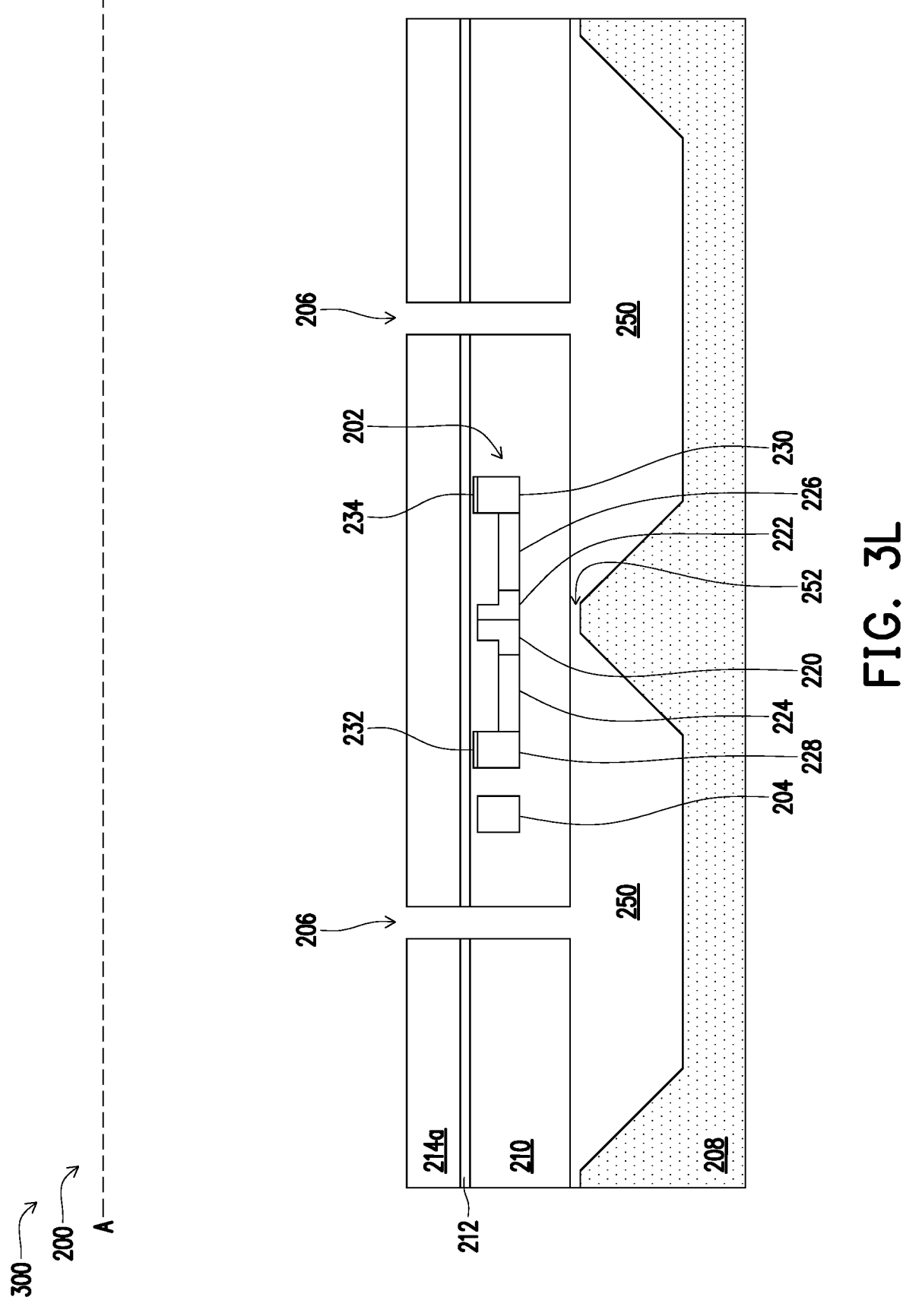
Figure 3M:
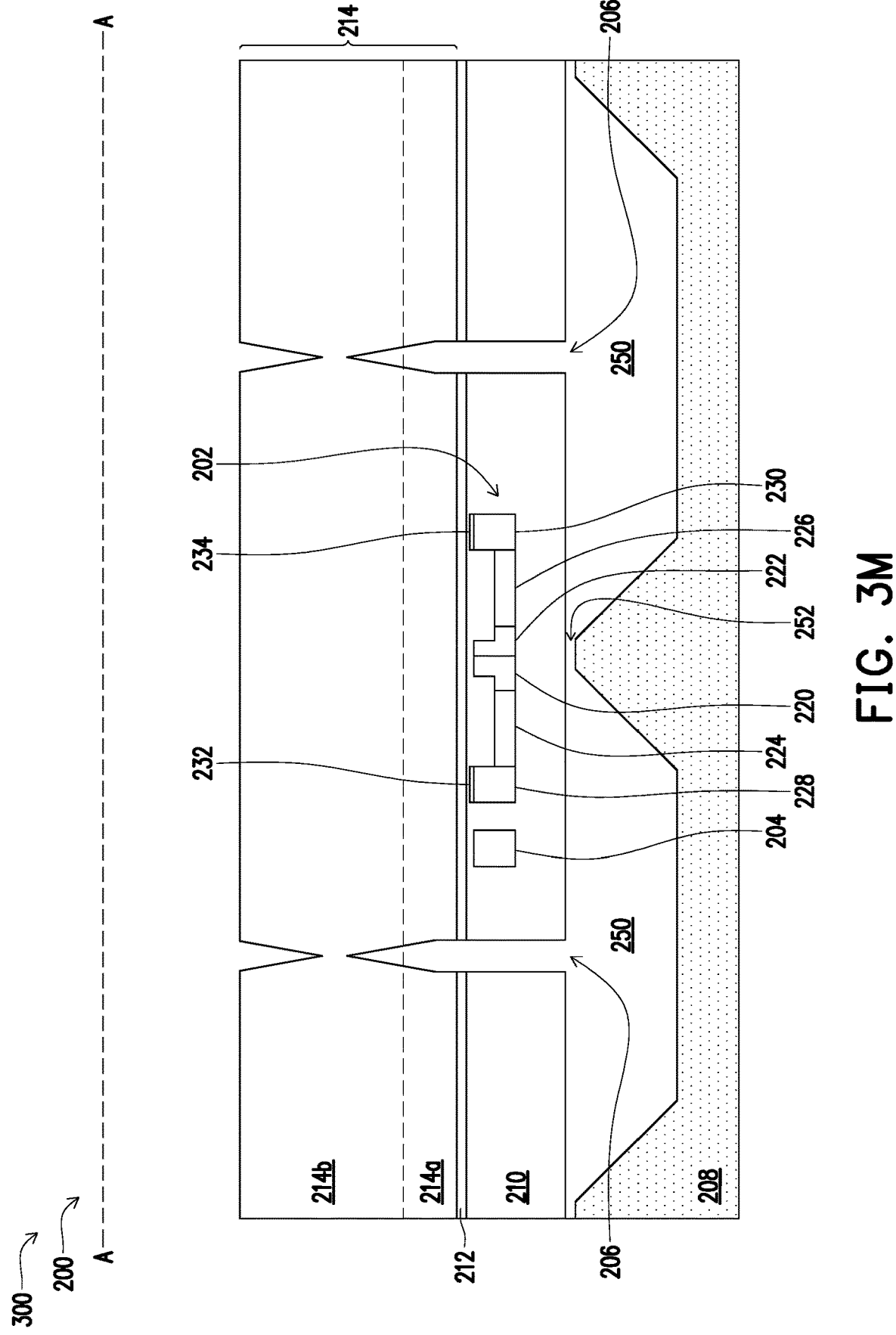
Figure 3N:
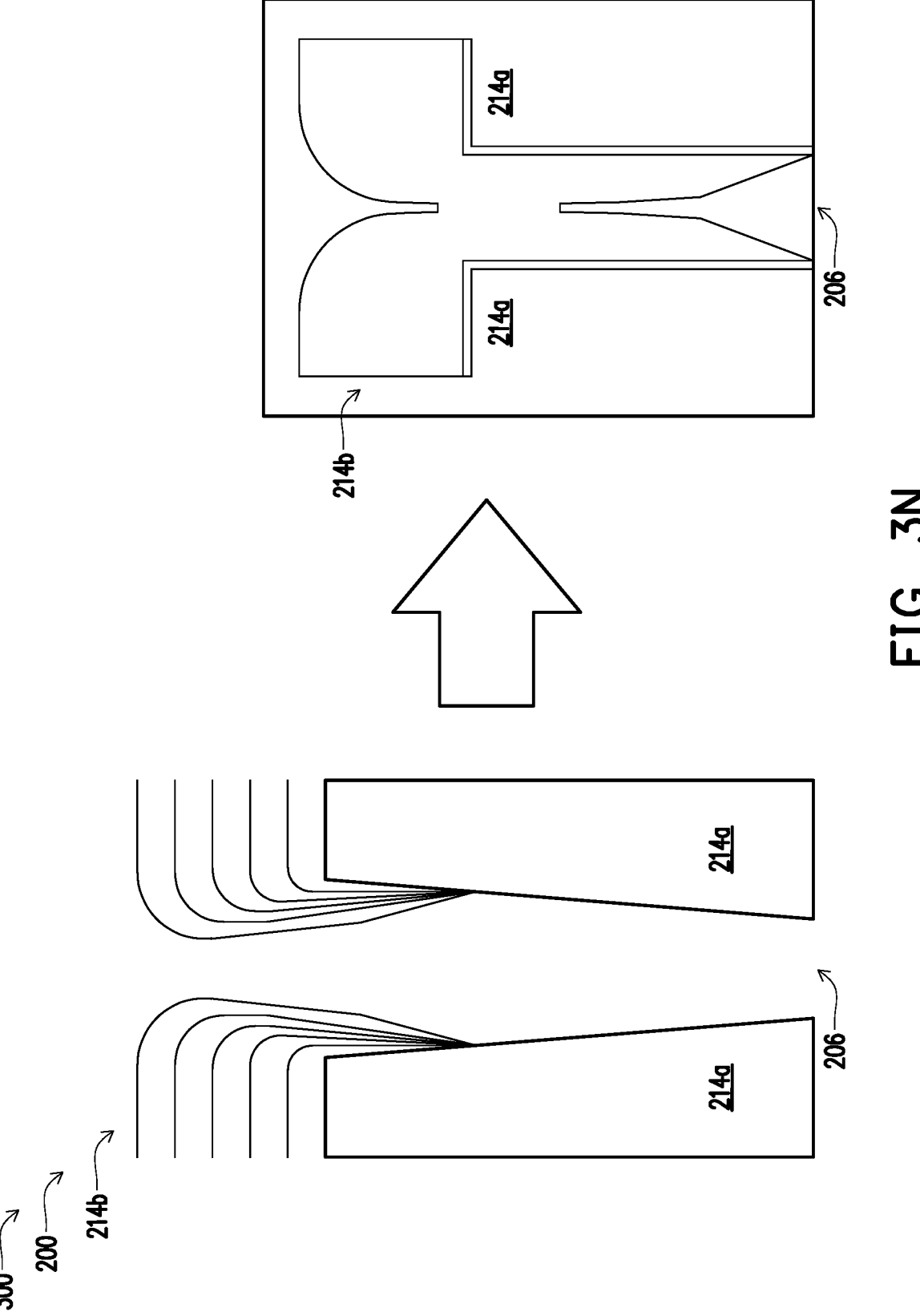
Figure 30:
Figure 3P:
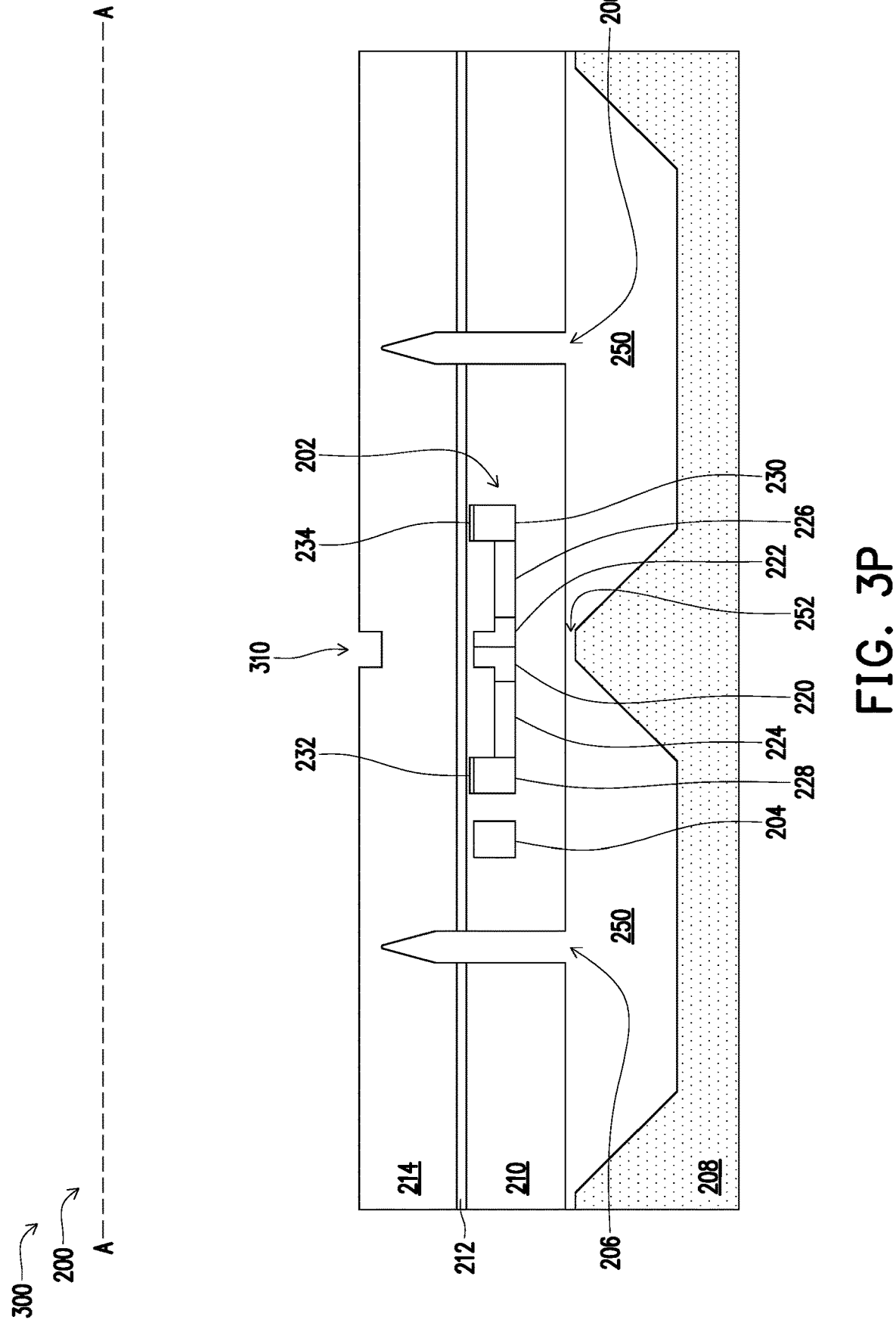
Figure 3Q:
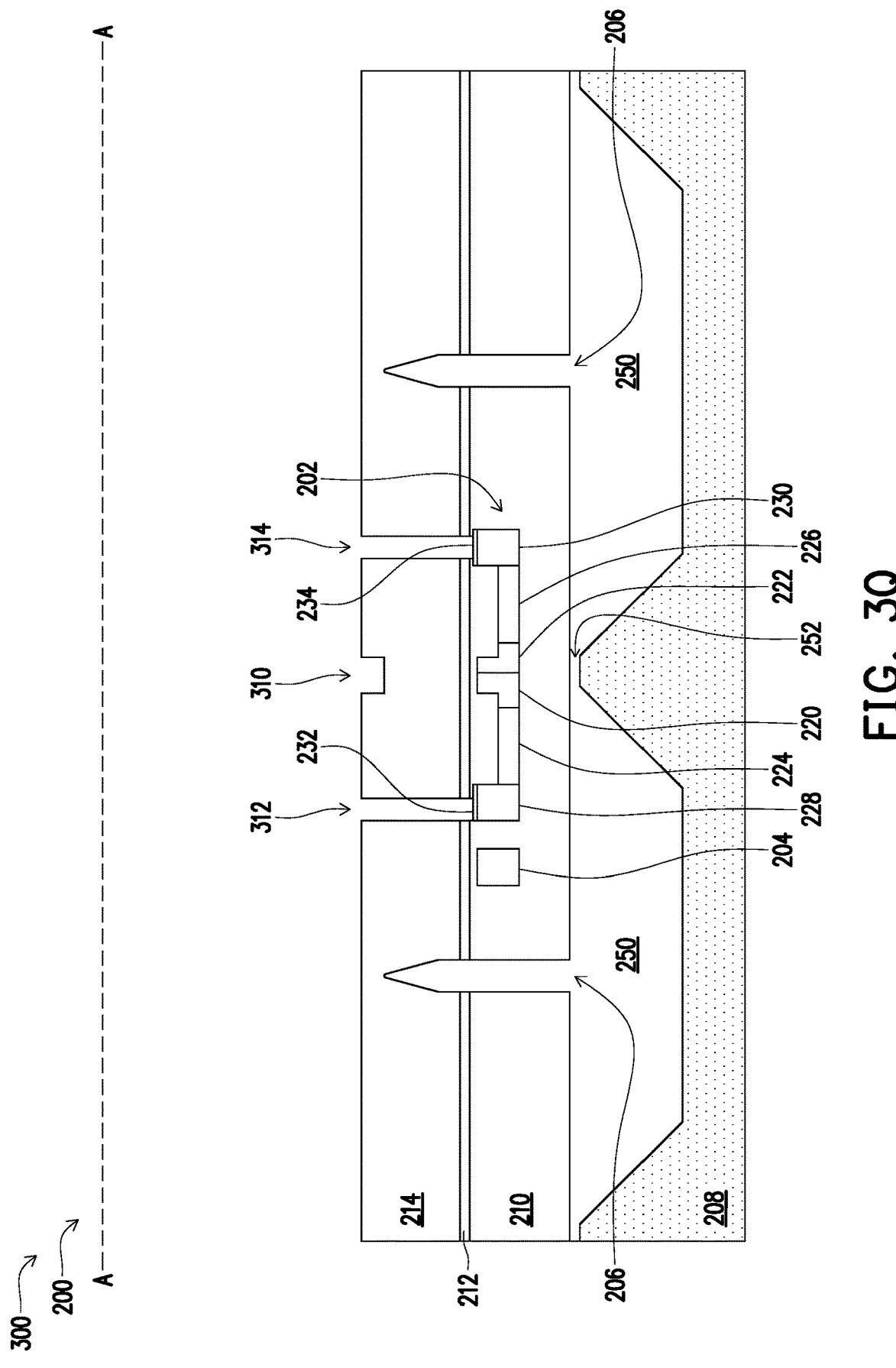
Figure 3R:
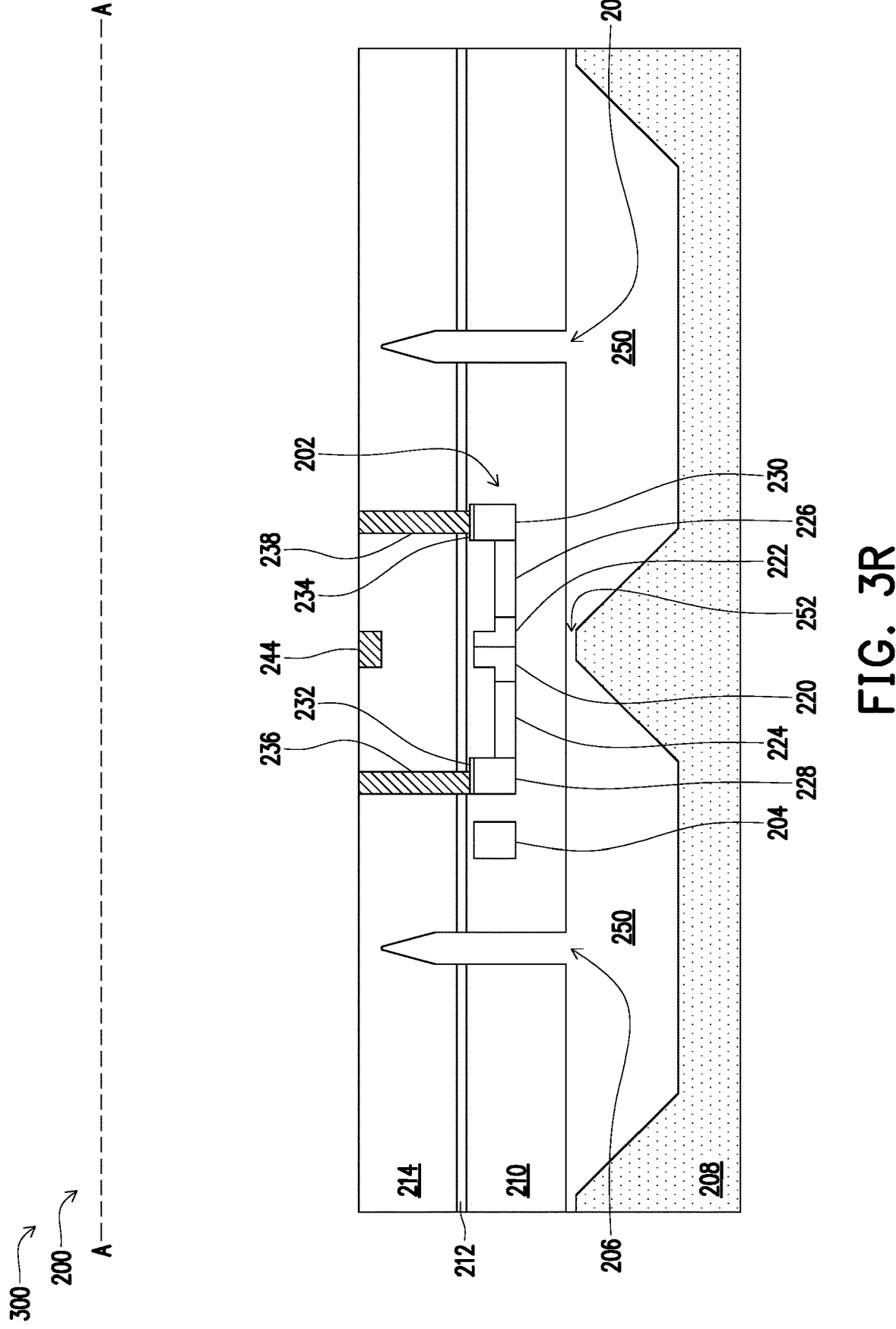
Figure 3S:
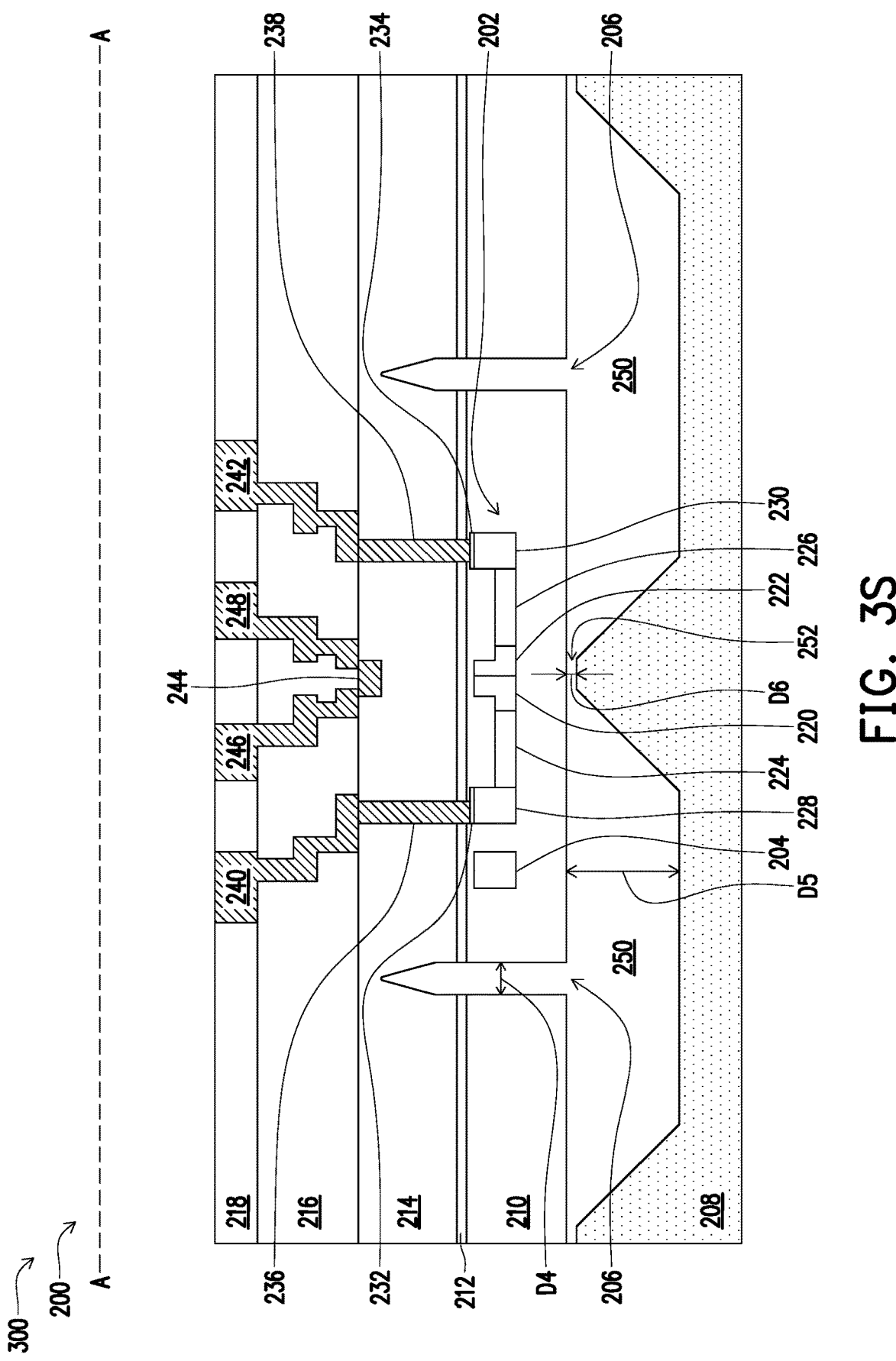

FIGS. 3A-3S are diagrams of an example implementation 300 of forming the semiconductor device 200 (or a portion thereof) described herein. In some implementations, one or more of the semiconductor processing operations described in connection with the example implementation 300 may be performed by one or more of the semiconductor processing tools 102-114 and/or by the wafer/die transport tool 116. In some implementations, one or more of the semiconductor processing operations described in connection with the example implementation 300 may be performed by another semiconductor processing tool.

Turning to FIG. 3A, a substrate 302 may be provided. The substrate 302 may include a silicon on insulator (SOI) substrate that includes the substrate 208 (e.g., a silicon (Si) substrate and/or another type of semiconductor substrate), the first dielectric layer 210 (e.g., a buried oxide or bottom oxide (BOX) layer and/or another type of insulator layer)

over and/or on the substrate 208, and a semiconductor layer 304 (e.g., a silicon (Si) layer and/or another type of semiconductor layer) over and/or on the first dielectric layer 210. In some implementations, a thickness of the first dielectric layer 210 (e.g., the BOX layer), prior to formation of the optical modulator structure 202 and the waveguide structure 204, may be included in a range of approximately 0.5 microns to approximately 3 microns. However, other values for the range are within the scope of the present disclosure.

Alternatively, the substrate 208 may be provided as a semiconductor wafer, and the deposition tool 102 may form the first dielectric layer 210 over and/or on the substrate 208, and may form the semiconductor layer 304 over and/or on the substrate 208. The deposition tool 102 may form the first dielectric layer 210 using a CVD technique, a PVD technique, an oxidation technique (e.g., a thermal oxidation technique), and/or another type of deposition technique. The deposition tool 102 may form the first dielectric layer 210 using a CVD technique, a PVD technique, an epitaxy technique, and/or another type of deposition technique.

As shown in FIGS. 3B-3D, the optical modulator structure 202 and the waveguide structure 204 may be formed in the semiconductor layer 304. In some implementations, a pattern in a hard mask layer 306 is used to etch the semiconductor layer 304 to form the optical modulator structure 202 and the waveguide structure 204. As shown in FIG. 3B, the deposition tool 102 may form the hard mask layer 306 on the semiconductor layer 304 (e.g., using a CVD technique, a PVD technique, and/or another type of deposition technique), and may form a photoresist layer on the hard mask layer 306 (e.g., using a spin-coating technique and/or another type of deposition technique). The exposure tool 104 exposes the photoresist layer to a radiation source to form a pattern in the photoresist layer. The developer tool 106 may develop and remove portions of the photoresist layer to expose the pattern.

As shown in FIG. 3C, the etch tool 108 may etch the hard mask layer 306 to transfer the pattern from the photoresist layer to the hard mask layer 306. As shown in FIG. 3D, the etch tool 108 etches the semiconductor layer 304 based on the pattern in the hard mask layer 306 to form the optical modulator structure 202 and the waveguide structure 204 by removing portions of the semiconductor layer 304 based on the pattern. In some implementations, the etch operation includes a plasma etch operation, a wet chemical etch operation, and/or another type of etch operation. In some implementations, a photoresist removal tool removes the remaining portions of the photoresist layer (e.g., using a chemical stripper, plasma ashing, and/or another technique). In some implementations, a photoresist removal tool removes the remaining portions of the photoresist layer (e.g., using a chemical stripper, plasma ashing, and/or another technique). In some implementations, the planarization tool 110 removes the remaining portions of the hard mask layer 306 using a CMP technique and/or another type of planarization technique.

As shown in FIG. 3E, additional material for the first dielectric layer 210 may be deposited to encapsulate the optical modulator structure 202 and the waveguide structure 204 in the first dielectric layer 210. The deposition tool 102 may deposit the additional material for the first dielectric layer 210 using a CVD technique, a PVD technique, an oxidation technique (e.g., a thermal oxidation technique), and/or another type of deposition technique. In some implementations, one or more additional semiconductor processing operation may be performed to deposit the additional material of the first dielectric layer 210. For example, the deposition tool 102 may perform a shallow trench isolation (STI) liner oxidation operation and/or a high density plasma (HDP) deposition operation to deposit the additional material of the first dielectric layer 210. As another example, the planarization tool 110 may perform a CMP operation and/or another type of planarization operation to planarize the first dielectric layer 210 after the additional material of the first dielectric layer 210 is deposited.

As shown in FIG. 3F, one or more portions of the optical modulator structure 202 may be doped with one or more types of dopants to form one or more doped regions in the optical modulator structure 202. For example, the ion implantation tool 114 may use an ion implantation technique and/or another type of doping technique to implant a p-doped region 220 with p-ions. As another example, the ion implantation tool 114 may use an ion implantation technique and/or another type of doping technique to implant a n-doped region 222 with n-ions. As another example, the ion implantation tool 114 may use an ion implantation technique and/or another type of doping technique to implant a p doped region 224 with p-type ions. As another example, the ion implantation tool 114 may use an ion implantation technique and/or another type of doping technique to implant a n doped region 226 with n-type ions.

As shown in FIG. 3G, one or more additional portions of the optical modulator structure 202 may be doped with one or more types of dopants to form one or more additional doped regions in the optical modulator structure 202. For example, the ion implantation tool 114 may use an ion implantation technique and/or another type of doping technique to implant a p+ doped region 228 with p+ ions. As another example, the ion implantation tool 114 may use an ion implantation technique and/or another type of doping technique to implant a n+ doped region 230 with n+ ions.

As shown in FIG. 3H, the planarization tool 110 may perform a CMP operation and/or another type of planarization operation to planarize the first dielectric layer 210 such that a top surfaces of the optical modulator structure 202 and a top surface of the waveguide structure 204 are exposed through the first dielectric layer 210. For example, the planarization tool 110 may perform a CMP operation and/or another type of planarization operation to planarize the first dielectric layer 210 such that the top surface of the p+ doped region 228 is exposed. As another example, the planarization tool 110 may perform a CMP operation and/or another type of planarization operation to planarize the first dielectric layer 210 such that the top surface of the n+ doped region 230 is exposed. As another example, the planarization tool 110 may perform a CMP operation and/or another type of planarization operation to planarize the first dielectric layer 210 such that the top surface of the p-doped region 220 is exposed. As another example, the planarization tool 110 may perform a CMP operation and/or another type of planarization operation to planarize the first dielectric layer 210 such that the top surface of the n-doped region 222 is exposed.

As further shown in FIG. 3H, a silicide layer 232 may be formed over and/or on the top surface of the p+ doped region 228, and a silicide layer 234 may be formed over and/or on the top surface of the n+ doped region 230. The silicide layer 232 and the silicide layer 234 may each include a metal silicide layer. The deposition tool 102 may deposit the silicide layer 232 and the silicide layer 234 using a CVD technique, a PVD technique, an ALD technique, and/or another deposition technique. In some implementations, the deposition tool 102 may perform a pre-clean operation to remove oxides (e.g., native oxides) from the top surface of the p+ doped region 228 and from the top surface of the n+ doped region 230 prior to formation of the silicide layer 232 and the silicide layer 234.

As shown in FIG. 3I, one or more additional layers may be formed over and/or on the first dielectric layer 210 after formation of the optical modulator structure 202 and/or after formation of the waveguide structure 204. For example, additional material of the first dielectric layer 210 may be formed over and/or on the first dielectric layer 210 (e.g., using one or more techniques described above in connection with FIG. 3G) such that the optical modulator structure 202 and the waveguide structure 204 are encapsulated in the first dielectric layer 210. As another example, the etch stop layer 212 may be formed over and/or on the first dielectric layer 210. As another example, a first portion 214a of the second dielectric layer 214 may be formed over and/or on the etch stop layer 212.

The deposition tool 102 may deposit the etch stop layer 212 and/or the first portion 214a of the second dielectric layer 214 in a PVD operation, an ALD operation, a CVD operation, an epitaxy operation, an oxidation operation, another type of deposition operation described in connection with FIG. 1, and/or another suitable deposition operation. In some implementations, the planarization tool 110 planarizes the etch stop layer 212 and/or the first portion 214a of the second dielectric layer 214 after the deposition tool 102 deposits the etch stop layer 212 and/or the first portion 214a of the second dielectric layer 214. In some implementations, the deposition tool 102 deposits the first portion 214a of the second dielectric layer 214 using a PECVD technique.

In some implementations, the etch stop layer 212 is formed to a thickness that is included in a range of approximately 200 angstroms to approximately 1000 angstroms. However, other values for the range are within the scope of the present disclosure. In some implementations, the first portion 214a of the second dielectric layer 214 is formed to a thickness approximately 0.2 microns to approximately 1 micron. However, other values for the range are within the scope of the present disclosure.

As shown in FIG. 3J, one or more undercut trenches 206 are formed through the first portion 214a of the second dielectric layer 214, through the etch stop layer 212, through the first dielectric layer 210, and to the substrate 208 such that the substrate 208 is exposed through the undercut trenches 206. In some implementations, undercut trenches 206 may be formed adjacent to one or more sides of the optical modulator structure 202 and/or adjacent to one or more sides of the waveguide structure 204, as shown in the example in FIG. 2A. In some implementations, one or more undercut trenches 206 may be formed at another location in the semiconductor device 200.

The undercut trenches 206 may be formed to enable removal of material from the substrate 208 through the undercut trenches 206. The undercut trenches 206 may be formed prior to the full formation of the second dielectric layer 214, prior to formation of the third dielectric layer 216, and/or prior to formation of the passivation layer 218. This enables the undercut trenches 206 to be capped off and closed up by deposition of a second portion of the second dielectric layer 214. This reduces the likelihood and/or prevents exposure of one or more portions of the semiconductor device 200 to humidity and/or another contaminant through the undercut trenches 206 relative to forming the undercut trenches 206 through the third dielectric layer 216 and the passivation layer 218 after formation of the third dielectric layer 216 and the passivation layer 218.

Moreover, forming the undercut trenches 206 prior to the full formation of the second dielectric layer 214, prior to formation of the third dielectric layer 216, and/or prior to formation of the passivation layer 218 results in a reduced etch depth for the undercut trenches 206. For example, the undercut trenches 206 may be etched to a depth that is included in a range of approximately 2 microns to approximately 3 microns where the undercut trenches 206 are etched prior to the full formation of the second dielectric layer 214, prior to formation of the third dielectric layer 216, and/or prior to formation of the passivation layer 218. Conversely, the undercut trenches 206 may be etched to a depth that is included in a range of approximately 5 microns to approximately 7 microns where the undercut trenches 206 are etched after the full formation of the second dielectric layer 214, after the formation of the third dielectric layer 216, and/or after the formation of the passivation layer 218. This reduced etch depth may result in reduced processing cost and complexity for forming the undercut trenches 206, and/or may result in reduced processing times for forming the undercut trenches 206, among other examples. However, other values for these ranges are within the scope of the present disclosure.

In some implementations, a pattern in a photoresist layer 308 is used to etch the first portion 214a of the second dielectric layer 214, the etch stop layer 212, and/or the first dielectric layer 210 to form the one or more undercut trenches 206. In these implementations, the deposition tool 102 forms the photoresist layer 308 on the first portion 214a of the second dielectric layer 214. The exposure tool 104 exposes the photoresist layer 308 to a radiation source to pattern the photoresist layer 308. The developer tool 106 develops and removes portions of the photoresist layer 308 to expose the pattern. The etch tool 108 etches the first portion 214a of the second dielectric layer 214, the etch stop layer 212, and/or the first dielectric layer 210 to form the one or more undercut trenches 206 through the first portion 214a of the second dielectric layer 214, through the etch stop layer 212, through the first dielectric layer 210, and to the substrate 208. In some implementations, the etch operation includes a plasma etch operation, a wet chemical etch operation, and/or another type of etch operation. In some implementations, a photoresist removal tool removes the remaining portions of the photoresist layer 308 (e.g., using a chemical stripper, plasma ashing, and/or another technique). In some implementations, a hard mask layer is used as an alternative technique for etching the first portion 214a of the second dielectric layer 214, the etch stop layer 212, and/or the first dielectric layer 210 to form the one or more undercut trenches 206 based on a pattern.

An undercut trench 206 may have a dimension D4, which may correspond to a cross-sectional width of the undercut trench 206. In some implementations, the dimension D4 is included in a range of approximately 0.5 microns to approximately 2 microns to enable the undercut trench 206 to be fully formed to the substrate 208 while enabling the undercut trench 206 to be subsequently sealed. However, other values for the range are within the scope of the present disclosure.

As shown in FIGS. 3K and 3L, material may be removed from the substrate 208 through the undercut trenches 206 to form undercut cavities 250 in the substrate 208 such that the undercut cavities 250 are located between the substrate 208 and the first dielectric layer 210. The etch tool 108 may perform an etch operation to etch the substrate 208 through the undercut trenches 206. Here, the etch tool 108 may provide an etchant (e.g., a wet etchant and/or another type of etchant) into the undercut trenches 206. The etchant may flow into the undercut trenches 206 to the substrate 208 and may etch material from the undercut trenches 206. The difference in etch selectivity between the substrate 208 and the layers 210, 212, and 214a may result in etching of the substrate 208 with minimal to no etching of the layers 210, 212, and 214a in the etch operation.

The etch operation may include an isotropic silicon wet etch, an isotropic silicon dry etch, a combination thereof, and/or another type of silicon etch. In implementations in which an isotropic silicon wet etch is performed, the etch tool 108 may use a wet etchant, such as tetramethylammonium hydroxide (TMAH) and/or another wet etchant, to etch the substrate 208. In implementations in which an isotropic silicon dry etch is performed, the etch tool 108 may use a dry etchant, such as sulfur hexafluoride ($SF_6$) and/or another dry etchant, to etch the substrate 208.

As further shown in FIG. 3L, the etch tool 108 may remove material from the substrate 208 such that an airgap spacer region 252 forms under the optical modulator structure 202 and between adjacent undercut cavities 250. This ensures that (or increases the likelihood of) that the substrate 208 is no longer in physical contact with the first dielectric layer 210 under the optical modulator structure 202, which provides increased thermal isolation between the substrate 208 and the optical modulator structure 202.

As shown in FIGS. 3M and 3N, a second portion 214b of the second dielectric layer 214 may be formed over and/or on the first portion 214a of the second dielectric layer 214. The formation of the second portion 214b of the second dielectric layer 214 may cap the undercut trenches 206 such that the undercut trenches 206 are sealed by the second portion 214b of the second dielectric layer 214. The deposition tool 102 may deposit the second portion 214b of the second dielectric layer 214 to a thickness that is included in a range of approximately 1 micron to approximately 2 microns to fully seal the undercut trenches 206. However, other values for the range are within the scope of the present disclosure.

As shown in FIG. 3N, the deposition tool 102 may deposit the material of the second portion 214b of the second dielectric layer 214 such that the second portion 214b overhangs around the openings of the undercut trenches 206 as the film thickness of the second portion 214b increases. The deposition tool 102 may use a PECVD technique to deposit the second portion 214b of the second dielectric layer 214 because of the poor step coverage of PECVD relative to other deposition techniques. Step coverage refers to the conformality of depositing the material of the second portion 214b of the second dielectric layer 214. PECVD may be less conformal relative to ALD and other deposition techniques in that the use of PECVD to deposit the second portion 214b of the second dielectric layer 214 may result in a greater film growth rate on the top surface of the first portion 214a of the second dielectric layer 214 relative to the film growth rate on the sidewalls in the undercut trenches 206. The greater film growth rate on the top surface of the first portion 214a of the second dielectric layer 214 eventually results in merging or bridging of the second portion 214b of the second dielectric layer 214 on the top surface of the first portion 214a of the second dielectric layer 214 before the undercut trenches are fully backfilled by the material of the second portion 214b of the second dielectric layer 214. In this way, the undercut trenches 206 are sealed and remain hollow/unfilled. However, the use of other deposition techniques to seal the undercut trenches 206 are within the scope of the present disclosure.

As shown in FIG. 3O, the second dielectric layer 214 may be planarized after deposition of the second portion 214b of the second dielectric layer 214. The planarization tool 110 may planarize the second dielectric layer 214 using a CMP technique and/or another planarization technique.

As shown in FIG. 3P, a recess 310 may be formed in the second dielectric layer 214 after the second dielectric layer 214 is planarized. The recess 310 may be formed above and/or over the optical modulator structure 202. The recess 310 may be formed in preparation for forming the heater element 244 in the second dielectric layer 214.

In some implementations, a pattern in a photoresist layer is used to etch the second dielectric layer 214 to form the recess 310. In these implementations, the deposition tool 102 forms the photoresist layer on the second dielectric layer 214. The exposure tool 104 exposes the photoresist layer to a radiation source to pattern the photoresist layer. The developer tool 106 develops and removes portions of the photoresist layer to expose the pattern. The etch tool 108 etches the second dielectric layer 214 based on the pattern to form the recess 310 in the second dielectric layer 214. In some implementations, the etch operation includes a plasma etch operation, a wet chemical etch operation, and/or another type of etch operation. In some implementations, a photoresist removal tool removes the remaining portions of the photoresist layer (e.g., using a chemical stripper, plasma ashing, and/or another technique). In some implementations, a hard mask layer is used as an alternative technique for etching the second dielectric layer 214 based on a pattern. In some implementations, a photoresist removal tool removes the remaining portions of the photoresist layer (e.g., using a chemical stripper, plasma ashing, and/or another technique).

As shown in FIG. 3Q, a recess 312 may be formed through the second dielectric layer 214, through the etch stop layer 212, and into the first dielectric layer 210 to the optical modulator structure 202. In particular, the recess 312 may be formed over the p+ doped region 228 of the optical modulator structure 202 such that the silicide layer 232 is exposed through the recess 312.

In some implementations, a pattern in a photoresist layer is used to etch the second dielectric layer 214, the etch stop layer 212, and the first dielectric layer 210 to form the recess 312. In these implementations, the deposition tool 102 forms the photoresist layer on the second dielectric layer 214. The exposure tool 104 exposes the photoresist layer to a radiation source to pattern the photoresist layer. The developer tool 106 develops and removes portions of the photoresist layer to expose the pattern. The etch tool 108 etches through the second dielectric layer 214, through the etch stop layer 212, and into the first dielectric layer 210 to the optical modulator structure 202 to form the recess 312. In some implementations, the etch operation includes a plasma etch operation, a wet chemical etch operation, and/or another type of etch operation. In some implementations, a photoresist removal tool removes the remaining portions of the photoresist layer (e.g., using a chemical stripper, plasma ashing, and/or another technique). In some implementations, a hard mask layer is used as an alternative technique for forming the recess 312 based on a pattern. In some implementations, a photoresist removal tool removes the remaining portions of the photoresist layer (e.g., using a chemical stripper, plasma ashing, and/or another technique).

As shown in FIG. 3Q, a recess 314 may be formed through the second dielectric layer 214, through the etch stop layer 212, and into the first dielectric layer 210 to the optical modulator structure 202. In particular, the recess 314 may be formed over the n+ doped region 230 of the optical modulator structure 202 such that the silicide layer 234 is exposed through the recess 314.

In some implementations, a pattern in a photoresist layer is used to etch the second dielectric layer 214, the etch stop layer 212, and the first dielectric layer 210 to form the recess 314. In these implementations, the deposition tool 102 forms the photoresist layer on the second dielectric layer 214. The exposure tool 104 exposes the photoresist layer to a radiation source to pattern the photoresist layer. The developer tool 106 develops and removes portions of the photoresist layer to expose the pattern. The etch tool 108 etches through the second dielectric layer 214, through the etch stop layer 212, and into the first dielectric layer 210 to the optical modulator structure 202 to form the recess 314. In some implementations, the etch operation includes a plasma etch operation, a wet chemical etch operation, and/or another type of etch operation. In some implementations, a photoresist removal tool removes the remaining portions of the photoresist layer (e.g., using a chemical stripper, plasma ashing, and/or another technique). In some implementations, a hard mask layer is used as an alternative technique for forming the recess 314 based on a pattern. In some implementations, a photoresist removal tool removes the remaining portions of the photoresist layer (e.g., using a chemical stripper, plasma ashing, and/or another technique).

As shown in FIG. 3R, the heater element 244 may be formed in the recess 310, the contact structure 236 may be formed in the recess 312, and the contact structure 238 may be formed in the recess 314. The contact structure 236 may be formed on the silicide layer 232 in the recess 312 such that the contact structure 236 is over and electrically coupled with the p+ doped region 228 of the optical modulator structure 202. The contact structure 238 may be formed on the silicide layer 234 in the recess 314 such that the contact structure 238 is over and electrically coupled with the n+ doped region 230 of the optical modulator structure 202.

The deposition tool 102 and/or the plating tool 112 may deposit the heater element 244, the contact structure 236, and/or the contact structure 238 in a CVD operation, a PVD operation, an ALD operation, an electroplating operation, another deposition operation described above in connection with FIG. 1, and/or another suitable deposition operation. In some implementations, a seed layer is first deposited, and the heater element 244, the contact structure 236, and/or the contact structure 238 are deposited on the seed layer. In some implementations, the planarization tool 110 planarizes the heater element 244, the contact structure 236, and/or the contact structure 238 after the deposition tool 102 and/or the plating tool 112 deposits the heater element 244, the contact structure 236, and/or the contact structure 238.

As shown in FIG. 3S, the third dielectric layer 216 may be formed over and/or on the second dielectric layer 214, over and/or on the contact structure 236, over and/or on the contact structure 238, and/or over and/or on the heater element 244. The third dielectric layer 216 may be formed after formation of the undercut trenches 206 and after formation of the undercut cavities 250. Accordingly, the third dielectric layer 216 may be formed above and/or over the undercut trenches 206. The deposition tool 102 may deposit the third dielectric layer 216 in a PVD operation, an ALD operation, a CVD operation, an epitaxy operation, an oxidation operation, another type of deposition operation described in connection with FIG. 1, and/or another suitable deposition operation. In some implementations, the planarization tool 110 planarizes the third dielectric layer 216 after the deposition tool 102 deposits the third dielectric layer 216.

As further shown in FIG. 3S, the passivation layer 218 may be formed over and/or on the third dielectric layer 216. The passivation layer 218 may be formed after formation of the undercut trenches 206 and after formation of the undercut cavities 250. Accordingly, the passivation layer 218 may be formed above and/or over the undercut trenches 206. The deposition tool 102 may deposit the passivation layer 218 in a PVD operation, an ALD operation, a CVD operation, an epitaxy operation, an oxidation operation, another type of deposition operation described in connection with FIG. 1, and/or another suitable deposition operation. In some implementations, the planarization tool 110 planarizes the passivation layer 218 after the deposition tool 102 deposits the passivation layer 218.

As further shown in FIG. 3S, the one or more metallization layers 240, 242, 246, and 248 may be formed in the third dielectric layer 216 and in the passivation layer 218. The deposition tool 102 and/or the plating tool 112 may deposit the one or more metallization layers 240, 242, 246, and 248 in a CVD operation, a PVD operation, an ALD operation, an electroplating operation, another deposition operation described above in connection with FIG. 1, and/or another suitable deposition operation. In some implementations, a seed layer is first deposited, and the one or more metallization layers 240, 242, 246, and 248 are deposited on the seed layer. In some implementations, the planarization tool 110 planarizes the one or more metallization layers 240, 242, 246, and/or 248 after the deposition tool 102 and/or the plating tool 112 deposits the one or more metallization layers 240, 242, 246, and/or 248.

In some implementations, the one or more metallization layers 240, 242, 246, and 248 may be formed in a plurality of deposition operations. For example, a first portion of the third dielectric layer 216 may be formed, and first portions of the one or more metallization layers 240, 242, 246, and 248 may be formed in the first portion of the third dielectric layer 216; a second portion of the third dielectric layer 216 may be formed, and second portions of the one or more metallization layers 240, 242, 246, and 248 may be formed in the second portion of the third dielectric layer 216; and so on. Then, the passivation layer 218 may be formed, and additional portions (e.g., contact pads) of the one or more metallization layers 240, 242, 246, and 248 may be formed in the passivation layer 218.

As indicated above, FIGS. 3A-3S are provided as an example. Other examples may differ from what is described with regard to FIGS. 3A-3S.

Figure 4:
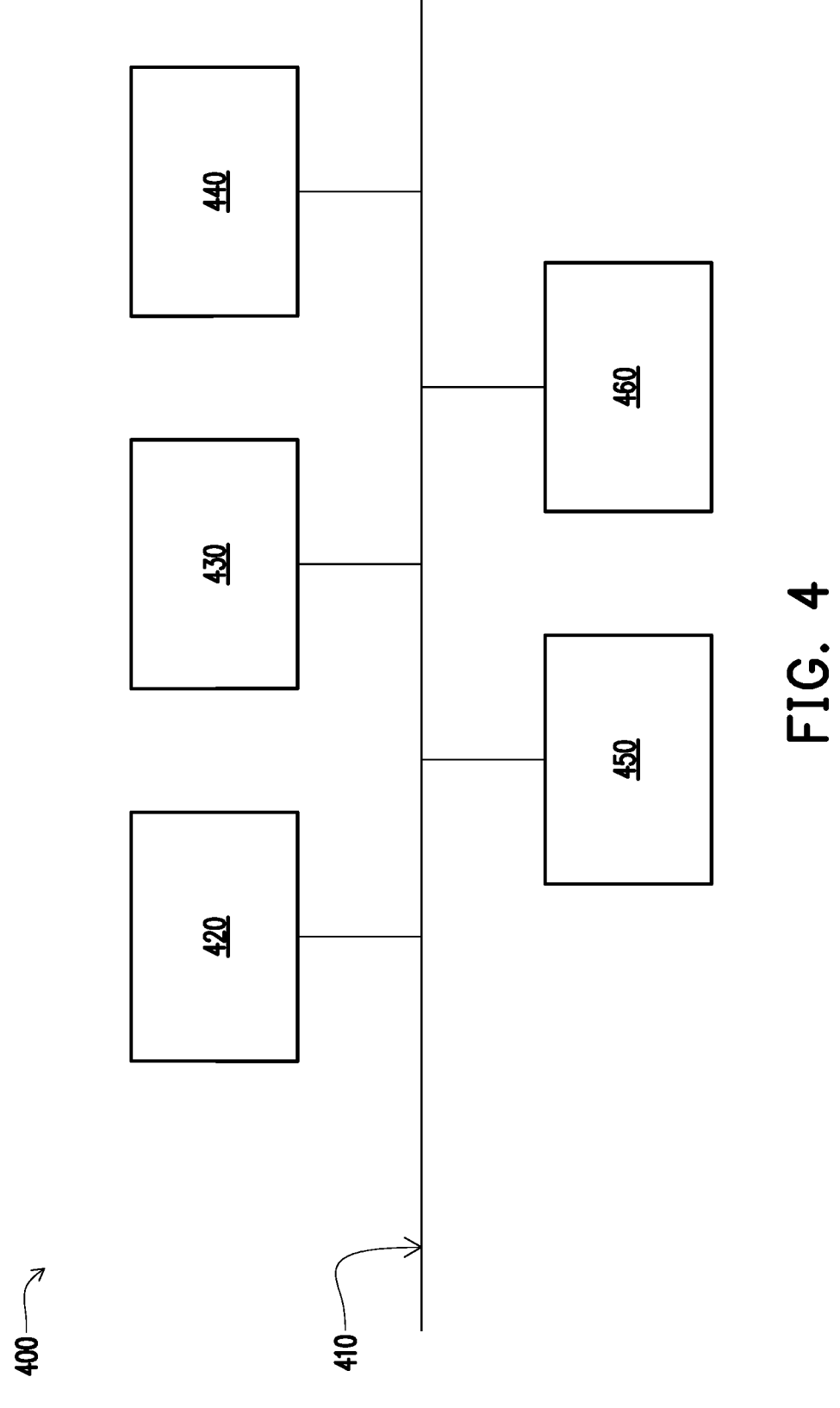
FIG. 4 is a diagram of example components of a device described herein.

FIG. 4 is a diagram of example components of a device 400 described herein. In some implementations, one or more of the semiconductor processing tools 102-114 and/or the wafer/die transport tool 116 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 associated with forming a semiconductor photonics device. In some implementations, one or more process blocks of FIG. 5 are performed by one or more semiconductor processing tools (e.g., one or more of the semiconductor processing tools 102-116). Additionally, or alternatively, one or more process blocks of FIG. 5 may be performed by one or more components of device 400, such as processor 420, memory 430, input component 440, output component 450, and/or communication component 460.

As shown in FIG. 5, process 500 may include forming, in a semiconductor layer above a first dielectric layer, an optical modulator structure and a waveguide structure adjacent to the optical modulator structure (block 510). For example, one or more of the semiconductor processing tools 102-116 may form, in a semiconductor layer 304 above a first dielectric layer 210, an optical modulator structure 202 and a waveguide structure 204 adjacent to the optical modulator structure 202, as described herein.

As further shown in FIG. 5, process 500 may include forming an etch stop layer over the first dielectric layer, over the optical modulator structure, and over the waveguide structure (block 520). For example, one or more of the semiconductor processing tools 102-116 may form an etch stop layer 212 over the first dielectric layer 210, over the optical modulator structure 202, and over the waveguide structure 204, as described herein.

As further shown in FIG. 5, process 500 may include forming a first portion of a second dielectric layer over the etch stop layer (block 530). For example, one or more of the semiconductor processing tools 102-116 may form a first portion 214*a* of a second dielectric layer 214 over the etch stop layer 212, as described herein.

As further shown in FIG. 5, process 500 may include forming a plurality of undercut trenches through the second dielectric layer, through the etch stop layer, through the first dielectric layer to a substrate under the first dielectric layer (block 540). For example, one or more of the semiconductor processing tools 102-116 may form a plurality of undercut trenches 206 through the second dielectric layer 214, through the etch stop layer 212, through the first dielectric layer 210 to a substrate 208 under the first dielectric layer 210, as described herein.

As further shown in FIG. 5, process 500 may include removing material from the substrate through the plurality of undercut trenches to form a plurality of undercut cavities in the substrate (block 550). For example, one or more of the semiconductor processing tools 102-116 may remove material from the substrate 208 through the plurality of undercut trenches 206 to form a plurality of undercut cavities 250 in the substrate 208, as described herein.

As further shown in FIG. 5, process 500 may include forming, after removing the material from the substrate, a second portion of the second dielectric layer on the first portion (block 560). For example, one or more of the semiconductor processing tools 102-116 may form, after removing the material from the substrate 208, a second portion 214*b* of the second dielectric layer 214 on the first portion 214*a*, as described herein. In some implementations, the second portion 214*b* seals the plurality of undercut trenches 206.

Process 500 may include additional implementations, such as any single implementation or any combination of implementations described below and/or in connection with one or more other processes described elsewhere herein.

In a first implementation, process 500 includes performing a planarization operation to planarize the second dielectric layer 214 after forming the second portion 214*b* of the second dielectric layer 214.

In a second implementation, alone or in combination with the first implementation, process 500 includes forming a third dielectric layer 216 over the plurality of undercut trenches 206 after forming the second portion 214*b* of the second dielectric layer 214.

In a third implementation, alone or in combination with one or more of the first and second implementations, process 500 includes forming a passivation layer 218 over the plurality of undercut trenches 206 after forming the second portion 214*b* of the second dielectric layer 214.

In a fourth implementation, alone or in combination with one or more of the first through third implementations, forming the second portion 214*b* of the second dielectric layer 214 includes depositing the second portion 214*b* of the second dielectric layer 214 using a PECVD technique.

In a fifth implementation, alone or in combination with one or more of the first through fourth implementations, forming the second portion 214*b* of the second dielectric layer 214 includes forming the second portion 214*b* of the second dielectric layer 214 to a thickness that is included in a range of approximately 1 micron to approximately 2 microns.

In a sixth implementation, alone or in combination with one or more of the first through fifth implementations, process 500 includes forming, after forming the second portion 214*b* of the second dielectric layer 214, a heater element 244 in the second dielectric layer 214, where the heater element 244 is formed above the optical modulator structure 202.

In a seventh implementation, alone or in combination with one or more of the first through sixth implementations, process 500 includes forming, after forming the second portion 214*b* of the second dielectric layer 214, a plurality of contact structures (e.g., a contact structure 236, a contact structure 238) that extend through the second dielectric layer 214, though the etch stop layer 212, and into the first dielectric layer 210, where the plurality of contact structures land on the optical modulator structure 202.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

In this way, a waveguide structure and an optical modulator structure of a photonic integrated circuit are formed in a dielectric region above a substrate of a semiconductor device. Openings are then formed through the dielectric region and to the substrate so that material can be removed from the substrate to form air gaps between the substrate and the dielectric region. The openings are then sealed by depositing dielectric material in the openings. Sealing the openings reduces the likelihood of exposure of the dielectric region and other regions of the semiconductor device to exposure to environmental elements such as humidity and oxygen. The reduced likelihood of exposure to these environmental elements, due to sealing the openings, may reduce the likelihood and/or rate of formation of defects in the dielectric region and the other regions of the semiconductor device. This may increase the reliability of the semiconductor device and/or may increase the performance of the photonic integrated circuit. Moreover, this may reduce the failure rate (and thus, may increase the yield) of semiconductor devices that include air gaps between a dielectric region and a substrate of the semiconductor devices.

As described in greater detail above, some implementations described herein provide a semiconductor device. The semiconductor device includes a substrate. The semiconductor device includes a first dielectric layer over the substrate. The semiconductor device includes an etch stop layer over the first dielectric layer. The semiconductor device includes a second dielectric layer over the etch stop layer. The semiconductor device includes an optical modulator structure in the first dielectric layer. The semiconductor device includes a waveguide structure in the first dielectric layer and adjacent to the optical modulator structure. The semiconductor device includes one or more undercut cavities in the substrate. The semiconductor device includes one or more undercut trenches that extend from the one or more undercut cavities through the first dielectric layer, through the etch stop layer, and terminate in the second dielectric layer.

As described in greater detail above, some implementations described herein provide a method. The method includes forming, in a semiconductor layer above a first dielectric layer, an optical modulator structure and a waveguide structure adjacent to the optical modulator structure. The method includes forming an etch stop layer over the first dielectric layer, over the optical modulator structure, and over the waveguide structure. The method includes forming a first portion of a second dielectric layer over the etch stop layer. The method includes forming a plurality of undercut trenches through the second dielectric layer, through the etch stop layer, through the first dielectric layer to a substrate under the first dielectric layer. The method includes removing material from the substrate through the plurality of undercut trenches to form a plurality of undercut cavities in the substrate. The method includes forming, after removing the material from the substrate, a second portion of the second dielectric layer on the first portion, where the second portion seals the plurality of undercut trenches.

As described in greater detail above, some implementations described herein provide a semiconductor device. The semiconductor device includes a substrate. The semiconductor device includes a first dielectric layer over the substrate. The semiconductor device includes an etch stop layer over the first dielectric layer. The semiconductor device includes a second dielectric layer over the etch stop layer. The semiconductor device includes an optical modulator structure in the first dielectric layer. The semiconductor device includes a heater element adjacent to the optical modulator structure and included in the second dielectric layer. The semiconductor device includes a waveguide structure in the first dielectric layer and adjacent to the optical modulator structure. The semiconductor device includes a plurality of undercut cavities in the substrate. The semiconductor device includes an airgap spacer region under the optical modulator structure and between the plurality of undercut cavities, where the airgap spacer region connects the plurality of undercut cavities. The semiconductor device includes a plurality of undercut trenches that extend from the plurality of undercut cavities through the first dielectric layer, through the etch stop layer, and terminate in the second dielectric layer.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor device, comprising:
a substrate;
a first dielectric layer over the substrate;
an etch stop layer over the first dielectric layer;
a second dielectric layer over the etch stop layer;
an optical modulator structure in the first dielectric layer;
a waveguide structure in the first dielectric layer and adjacent to the optical modulator structure;
a plurality of undercut cavities in the substrate;
an airgap spacer region between the substrate and the first dielectric layer,
    wherein the airgap spacer region is connected with the plurality of undercut cavities; and
one or more undercut trenches that extend from the plurality of undercut cavities through the first dielectric layer, through the etch stop layer, and terminate in the second dielectric layer.

2. The semiconductor device of claim 1,
wherein the one or more undercut trenches are located adjacent to at least one of the optical modulator structure or the waveguide structure.

3. The semiconductor device of claim 1,
wherein a width of an undercut trench, of the one or more undercut trenches, is included in a range of approximately 0.5 microns to approximately 2 microns.

4. The semiconductor device of claim 1,
wherein a distance between the substrate and the first dielectric layer, in the airgap spacer region, is included in a range of approximately 1 micron to approximately 5 microns.

5. The semiconductor device of claim 1,
wherein the plurality of undercut cavities are located under at least one of the optical modulator structure or the waveguide structure.

6. The semiconductor device of claim 1,
wherein a distance between the substrate and the first dielectric layer, in an undercut cavity of the plurality of undercut cavities, is included in a range of approximately 3 microns to approximately 10 microns.

7. A method, comprising:
forming, in a semiconductor layer above a first dielectric layer, an optical modulator structure and a waveguide structure adjacent to the optical modulator structure;
forming an etch stop layer over the first dielectric layer, over the optical modulator structure, and over the waveguide structure;
forming a first portion of a second dielectric layer over the etch stop layer;
forming a plurality of undercut trenches through the second dielectric layer, through the etch stop layer, through the first dielectric layer to a substrate under the first dielectric layer;

removing material from the substrate through the plurality of undercut trenches to form a plurality of undercut cavities in the substrate;

forming, after removing the material from the substrate, an airgap spacer region between the substrate and the first dielectric layer, wherein the airgap spacer region is connected with the plurality of undercut cavities; and forming, after removing the material from the substrate, a second portion of the second dielectric layer on the first portion, wherein the second portion seals the plurality of undercut trenches.

8. The method of claim 7, further comprising:

performing a planarization operation to planarize the second dielectric layer after forming the second portion of the second dielectric layer.

9. The method of claim 7, further comprising:

forming a third dielectric layer over the plurality of undercut trenches after forming the second portion of the second dielectric layer.

10. The method of claim 7, further comprising:

forming a passivation layer over the plurality of undercut trenches after forming the second portion of the second dielectric layer.

11. The method of claim 7, wherein forming the second portion of the second dielectric layer comprises:

depositing the second portion of the second dielectric layer using a plasma enhanced chemical vapor deposition (PECVD) technique.

12. The method of claim 7, wherein forming the second portion of the second dielectric layer comprises:

forming the second portion of the second dielectric layer to a thickness that is included in a range of approximately 1 micron to approximately 2 microns.

13. The method of claim 7, further comprising:

forming, after forming the second portion of the second dielectric layer, a heater element in the second dielectric layer, wherein the heater element is formed above the optical modulator structure.

14. The method of claim 7, further comprising:

forming, after forming the second portion of the second dielectric layer, a plurality of contact structures that extend through the second dielectric layer, the etch stop layer, and into the first dielectric layer, wherein the plurality of contact structures are on the optical modulator structure.

15. A semiconductor device, comprising:

a substrate;

a first dielectric layer over the substrate;

an etch stop layer over the first dielectric layer;

a second dielectric layer over the etch stop layer;

an optical modulator structure in the first dielectric layer;

a heater element adjacent to the optical modulator structure and included in the second dielectric layer;

a waveguide structure in the first dielectric layer and adjacent to the optical modulator structure;

a plurality of undercut cavities in the substrate;

an airgap spacer region under the optical modulator structure and between the plurality of undercut cavities, wherein the airgap spacer region connects the plurality of undercut cavities; and a plurality of undercut trenches that extend from the plurality of undercut cavities through the first dielectric layer, through the etch stop layer, and terminate in the second dielectric layer.

16. The semiconductor device of claim 15, wherein a first undercut trench, of the plurality of undercut trenches, is located adjacent to the waveguide structure; and wherein a second undercut trench, of the plurality of undercut trenches, is located adjacent to the optical modulator structure.

17. The semiconductor device of claim 16, wherein a distance between the second undercut trench and the optical modulator structure is included in a range of approximately 2 microns to approximately 6 microns.

18. The semiconductor device of claim 15, wherein a first undercut trench, of the plurality of undercut trenches, is located adjacent to a first side of the optical modulator structure; and wherein a second undercut trench, of the plurality of undercut trenches, is located adjacent to a second side of the optical modulator structure opposing the first side.

19. The semiconductor device of claim 15, wherein an undercut trench, of the plurality of undercut trenches, is located within a perimeter of the optical modulator structure.

20. The semiconductor device of claim 15, further comprising:

a third dielectric layer over the plurality of undercut trenches.

\* \* \* \* \*